(12) United States Patent
Jibbe

(10) Patent No.: US 6,311,320 B1
(45) Date of Patent: Oct. 30, 2001

(54) ALTERABLE SCRIPTING TOOL AND METHOD

(75) Inventor: Mahmoud K. Jibbe, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/206,535

(22) Filed: Dec. 7, 1998

(51) Int. Cl.[7] .................................................. G06F 9/45
(52) U.S. Cl. ............................ 717/1; 717/2; 717/3; 717/4
(58) Field of Search .................... 717/1, 3, 4, 2; 345/353; 714/38

(56) References Cited

U.S. PATENT DOCUMENTS

| | | | |
|---|---|---|---|
| 5,179,703 | 1/1993 | Evans | 717/3 |
| 5,220,675 | 6/1993 | Padawer et al. | 345/333 |
| 5,335,320 | 8/1994 | Iwata et al. | 717/4 |
| 5,345,550 | 9/1994 | Bloomfield | 345/353 |
| 5,367,633 * | 11/1994 | Matheny et al. | 395/514 |
| 5,398,312 | 3/1995 | Hoffmann | 604/218 |
| 5,475,843 | 12/1995 | Halviatti et al. | 717/4 |
| 5,490,249 | 2/1996 | Miller | 714/38 |
| 5,546,522 | 8/1996 | Nishida et al. | 345/353 |
| 5,546,581 | 8/1996 | McKinnis et al. | 712/220 |
| 5,581,685 | 12/1996 | Sakurai | 345/353 |
| 5,617,527 | 4/1997 | Kressin et al. | 345/326 |
| 5,664,185 | 9/1997 | Landfield et al. | 707/104 |
| 5,669,000 | 9/1997 | Jessen et al. | 717/4 |
| 5,689,665 | 11/1997 | Mitsui et al. | 345/342 |
| 5,712,993 | 1/1998 | Ichikawa | 345/326 |
| 5,905,896 | 5/1999 | Delannoy | 711/11 |
| 5,954,829 * | 9/1999 | McLain, Jr. et al. | 714/712 |
| 6,002,868 | 12/1999 | Jenkins et al. | 717/1 |
| 6,002,871 | 12/1999 | Duggan et al. | 717/4 |
| 6,094,684 * | 7/2000 | Pallmann | 709/227 |
| 6,147,773 * | 11/2000 | Taylor et al. | 358/400 |
| 6,216,120 * | 4/2001 | Ueno et al. | 706/47 |

* cited by examiner

Primary Examiner—Mark R. Powell
Assistant Examiner—Chameli Das

(57) ABSTRACT

A scripting tool for executing a script command having at least one parameter includes a display device, a processor, and a memory. The memory has stored therein instructions which when executed by the processor cause the processor to generate a user input control for a parameter of the script command based upon a definition file, and display the user input control upon the display device. The instructions of the memory when executed by the processor further cause the processor to receive user input via the user input control, and generate a parameter value based upon the user input. Moreover, the instructions when executed by the processor cause the processor to set the parameter of the script command equal to the parameter value, and execute the script command based upon the parameter.

20 Claims, 12 Drawing Sheets

```
1   [COMMAND_LIST]
2       COMMAND1=BRANCH
3       COMMAND2=CALL
4       COMMAND3=COMMENT
5       COMMAND4=DELAY
6       COMMAND5=WRITE
7           :
8       COMMAND65=DISK_RAND_WR_VER
9           :
10
11  [BRANCH]
12      :
13
14  [CALL]
15      :
16
17  [COMMENT]
18      :
19
20  [DELAY]
21      :
22
23  [WRITE]
24      :
25
26  DISK_RAND_WR_VER
27      NFIELD=15
28      [DISK_RAND_WR_VER_FIELD1]
29      PROMPT=timer
30          INPUT_TYPE=1
31          CHOICES=enabled, disabled
32          RETURNS=enabled, disabled
33          TEXT=disabled
34      [DISK_RAND_WR_VER_FIELD2]
35      PROMPT=dpo
36          INPUT_TYPE=1
37          CHOICES=off, on
38          RETURNS=off, on
39          TEXT=off
40      [DISK_RAND_WR_VER_FIELD4]
41      PROMPT=fua
42          INPUT_TYPE=1
43          CHOICES=off, on
44          RETURNS=off, on
45          TEXT=off
46      [DISK_RAND_WR_VER_FIELD3]
47      PROMPT=block size
48          INPUT_TYPE=0
49          LENGTH=6
50          RANGE=0, 16383
51          VARIABLE_TYPE=0
52          TEXT=512
53      [DISK_RAND_WR_VER_FIELD5]
54      PROMPT=transfer_cnt_in_blks
55          INPUT_TYPE=0
56          LENGTH=5
57          RANGE=0, 100000
58          VARIABLE_TYPE=1
59          TEXT=4
60      [DISK_RAND_WR_VER_FIELD6]
61      PROMPT=io_cnt
62          INPUT_TYPE=0
63          LENGTH=8
64          RANGE=0, 3000000
65          VARIABLE_TYPE=1
66          TEXT=10000
67      [DISK_RAND_WR_VER_FIELD7]
68      PROMPT=start_block_address
69          INPUT_TYPE=0
70          LENGTH=10
71          RANGE=0, 4294967295
72          VARIABLE_TYPE=1
73          TEXT=0
74      [DISK_RAND_WR_VER_FIELD8]
75      PROMPT=soft_hard_error_log
76          INPUT_TYPE=1
77          CHOICES=enabled, disabled
78          RETURNS=enabled, disabled
79          TEXT=disabled
80      [DISK_RAND_WR_VER_FIELD9]
81      PROMPT=replace_defect_hw_sw
82          INPUT_TYPE=1
83          CHOICES=rep_sw,acum_sw,rep_hw,acum_hw
84          RETURNS=rep_sw,acum_sw,rep_hw,acum_hw
85          TEXT=rep-sw
86      [DISK_RAND_WR_VER_FIELD10]
87      PROMPT=end_block_address
88          INPUT_TYPE=0
89          LENGTH=10
90          RANGE=0, 4294967295
91          VARIABLE_TYPE=1
92          TEXT=0
93      [DISK_RAND_WR_VER_FIELD11]
94      PROMPT=data_pattern
95          INPUT_TYPE=0
96          LENGTH=32
97          VARIABLE_TYPE=2
98          RANGE=0, 4294967295
99          TEXT=00
100     [DISK_RAND_WR_VER_FIELD12]
101     PROMPT=block_id
102         INPUT_TYPE=1
103         CHOICES=enabled, disabled
104         RETURNS=enabled, disabled
105         TEXT=disabled
106     [DISK_RAND_WR_VER_FIELD13]
107     PROMPT=max_soft_err
108         INPUT_TYPE=0
109         LENGTH=5
110         RANGE=0, 1000
111         VARIABLE_TYPE=1
112         TEXT=10
113     [DISK_RAND_WR_VER_FIELD14]
114     PROMPT=max_retry_count
115         INPUT_TYPE=0
116         LENGTH=4
117         RANGE=0, 100
118         VARIABLE_TYPE=1
119         TEXT=0
120     [DISK_RAND_WR_VER_FIELD15]
121     PROMPT=max_retry_count
122         INPUT_TYPE=0
123         LENGTH=32
124         VARIABLE_TYPE=2
125
```

Fig. 8

ALTERABLE SCRIPTING TOOL AND METHOD

BACKGROUND OF THE INVENTION

The present invention relates generally to scripting tools, and, more particularly to a scripting tool whose operation and user interface are based upon a definition file.

Scripts are a series of commands which are executed by a program called an interpreter. Each time the interpreter executes a script, the interpreter converts each script command into series of operations and functions which may be executed by a processor, and then causes the processor to execute the series of operations and functions. As a result of the interpreter converting the script each time the script is executed, scripts tend to execute more slowly than compiled programs. However, if a script is modified, then the change will be effected the next time the interpreter executes the script. With a compiled program, the program would have to be recompiled before the change would take effect. As a result, scripts tend to be easier and quicker to modify than compiled programs.

One environment in which the ease of script modification is advantageous is in the testing of computer devices such as SCSI host adapters, and SCSI devices. For example, a technician may desire to see how the computer device responds to slightly different parameters. By using scripts, the technician may quickly modify the script with the different parameters and re-execute the script to see how the computer device responds.

While scripts provide a technician with a quick way of testing computer devices, scripting systems have historically suffered from a variety of problems. For example, script writing has historically required a technician which is not only fluent in the scripting language but also is quite knowledgeable about parameter ranges which are supported by the device under test. Moreover, scripting systems especially for testing SCSI devices have historically been limited to computer devices having similar characteristics. In particular, scripting systems have historically utilized low level device specific interfaces in order to test the computer device. As a result, each new computer device requires a new scripting systems be developed or purchased. Moreover, prior scripting systems did not provide an easy mechanism for the technician to determine exactly how the computer device responded to a given command of a test script.

In light of the above problems suffered by scripting systems, there is clearly a need for a scripting tool which (i) provides an environment that eases the writing of scripts, (ii) may be used to test a variety of computer devices, and (iii) provides a technician with a mechanism to determine how a computer device responds to a given command of a test script.

SUMMARY OF THE INVENTION

In accordance with one embodiment of the present invention, there is provided a method of utilizing a definition file to define characteristics of at least one parameter of a script command. One step of the method includes displaying for a parameter of the script command, a user input control defined by the definition file. Another step of the method includes receiving user input via the user input control. The method also includes the step of generating a parameter value based upon the user input. Furthermore, the method includes the step of setting the parameter of the script command equal to the parameter value.

Pursuant to another embodiment of the present invention, there is provided a scripting tool for executing a script command having at least one parameter. The scripting tool includes a display device, a processor, and a memory having stored therein instructions. The instructions when executed by the processor cause the processor to generate a user input control for a parameter of the script command based upon a definition file. The instructions when executed by the processor further cause the processor to (i) display the user input control upon the display device, and (ii) receive user input via the user input control. Moreover, the instructions when executed by the processor further cause the processor to (i) generate a parameter value based upon the user input, (ii) set the parameter of the script command equal to the parameter value, and (iii) execute the script command based upon the parameter.

Pursuant to yet another embodiment of the present invention, there is provided a method of executing a script command having at least one parameter. The method includes the step of generating a user input control for a parameter of the script command based upon a definition file. Another step of the method includes receiving user input for the parameter via the user input control. The method also includes the steps of generating a parameter value based upon the user input, and setting the parameter equal to the parameter value. Yet another step of the method includes executing the script command based upon the parameter.

It is an object of the present invention to provide an new scripting method and apparatus.

It is an object of the present invention to provide an improved scripting method and apparatus.

It is yet another object of the present invention to provide a scripting method and apparatus for testing computer devices.

It is yet further object of the present invention to provide a scripting method and apparatus for testing SCSI devices.

It is still another object of the present invention to provide a scripting method and apparatus in which allowable parameter value ranges may be easily modified.

It is still yet another object of the present invention to provide a scripting environment in which test scripts may be executed and created.

It is yet a further object of the present invention to provide a scripting method and apparatus which may be utilized to test a variety of computer devices.

Another object of the present invention is to provide a scripting method and apparatus in which a user may easily relate the results of executing a script command with the script command that caused the results.

The above and other objects, features, and advantages of the present invention will become apparent from the following description and the attached drawings.

BRIEF DESCRIPTION OF THE DRAWINGS

FIG. 8 illustrates an exemplary definition file of the scripting tool shown in FIG. 2;

DETAILED DESCRIPTION OF THE PREFERRED EMBODIMENT

Figure 1:
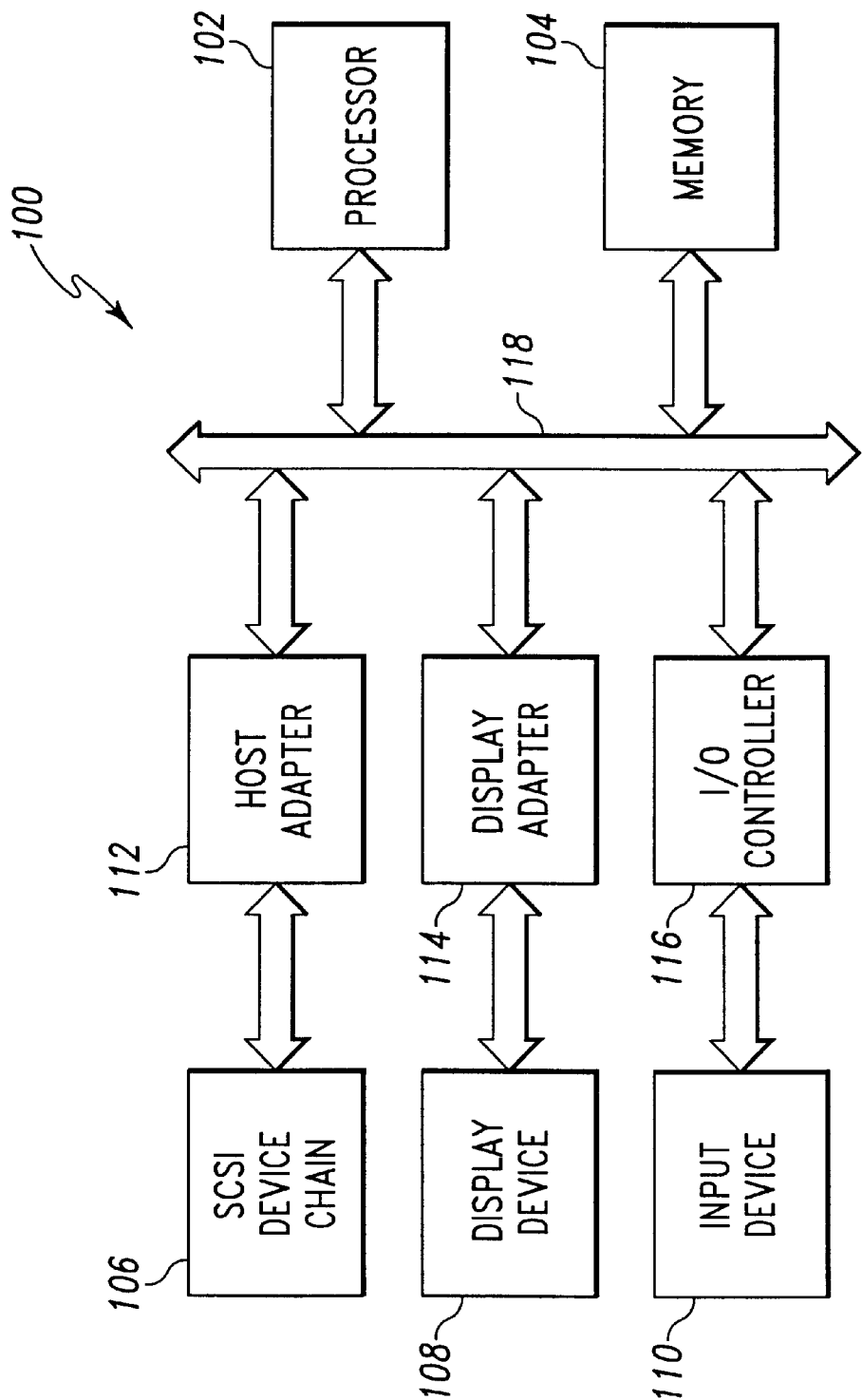
FIG. 1 shows a block diagram of a computer system in which features of the present invention may be incorporated.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 illustrates a computer system 100 in which various features of the present invention may be incorporated. In particular, the computer system 100 of FIG. 1 is suitable for implementing a scripting tool in accordance with features of the present invention. To this end, the computer system 100 includes a processor 102, a memory 104, a SCSI device chain 106, a display device 108, and input devices 110. Moreover, the computer system 100 includes a host adapter 112 for controlling the SCSI devices 106 (e.g. disk drives, CD-ROM drives, RAID device, scanners), a display adapter 114 for controlling the display device 108, an I/O controller 116 for controlling the input devices 110 (e.g. mice, keyboards, touch screens), and a system bus 118. The system bus 118 operably couples the processor 102 to the memory 104, the host adapter 112, the display adapter 114, and the I/O controller 116.

The memory 104 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, DAT (digital audio tape), and hard disks. The memory 104 may also include nonvolatile computer readable medium such as PROM (programmable read only memory), EPROM (electrically PROM), EEPROM (electrically erasable PROM), and flash memory that store software routines. In particular, the memory 104 stores instructions defining software routines that, when executed by the processor 102, cause the processor 102 to configure the computer system 100 into a scripting tool that may be used to test the SCSI devices 106 and host adapter 112. Moreover, the memory 104 is further operable to store operating system software such as Microsoft's Windows NT 4.0 operating system.

The processor 102 is operable to execute the software routines stored in the memory 104, and communicate with the SCSI devices 106, the display device 108, and the input devices 110 via the host adapter 112, the display adapter 114, and the I/O controller 116 respectively. In particular, the processor 102 is operable to execute software routines of the memory 104 which cause the processor 102 to implement a scripting tool that may test the SCSI devices 106 and the host adapter 112.

Figure 2:
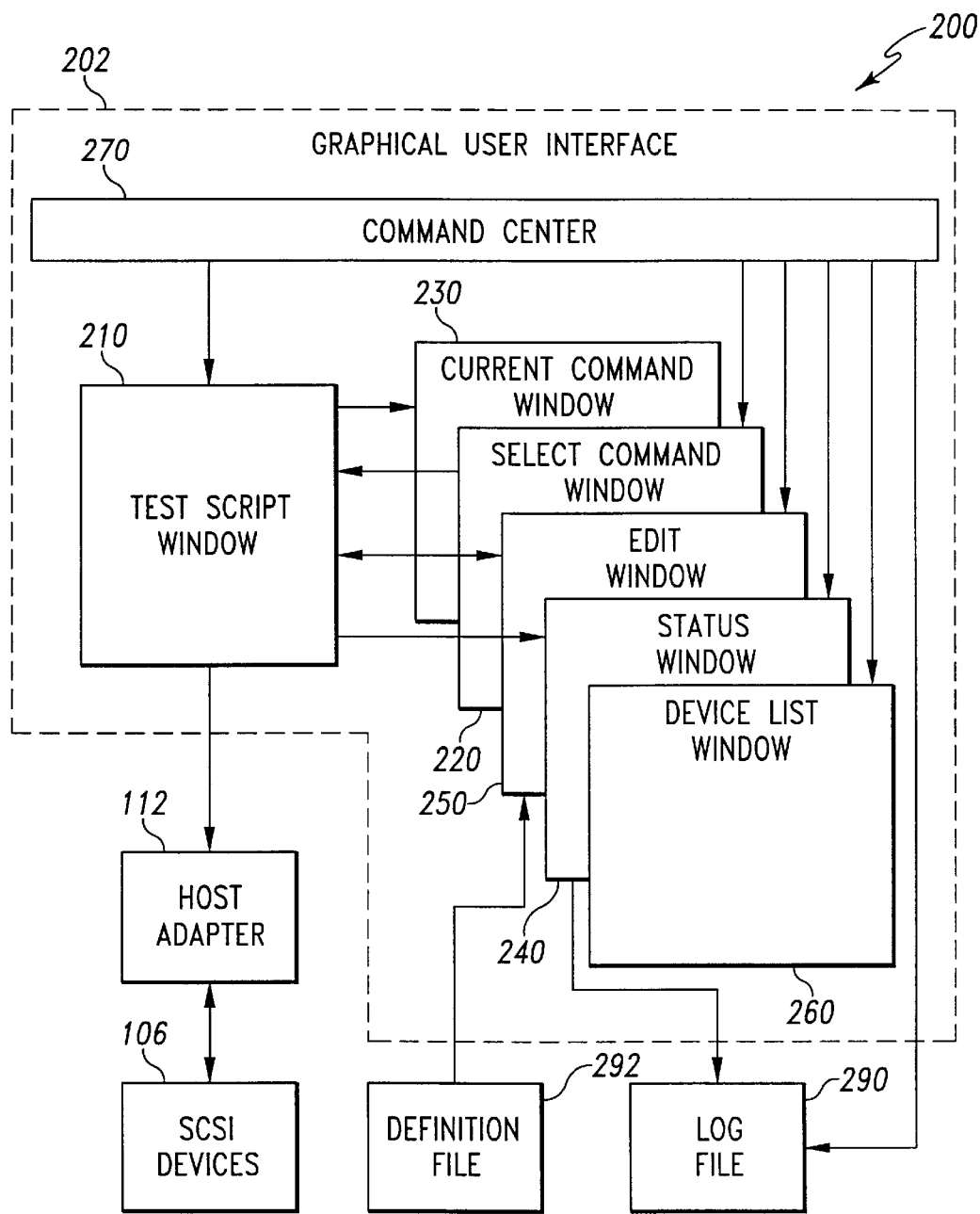
FIG. 2 illustrates a functional block diagram of a scripting tool which may be implemented by the computer system of FIG. 1.

In a preferred embodiment of the present invention, the computer system 100 implements a scripting tool 200 that incorporates features of the present invention. A functional block diagram of the scripting tool 200 is shown in FIG. 2. In general, the scripting tool 200 enables a user to create and execute scripts (also referred to as macros) that test SCSI devices coupled to a SCSI controller 106. In particular, the scripting tool 200 enables a user to interactively (i) create a test script by selecting commands from a set of script commands, (ii) define parameter values for the script commands of the test script, and (iii) execute the test script in order to test SCSI devices that are coupled to a SCSI controller. To this end, the scripting tool 200 includes a graphical user interface (GUI) 202, a log file 290, and a definition file 292 that cooperate to provide a user with a mechanism for (i) creating test scripts, and (ii) controlling execution of test scripts in order to test SCSI devices that are coupled to a SCSI controller.

Scripting Tool GUI

Figure 3:
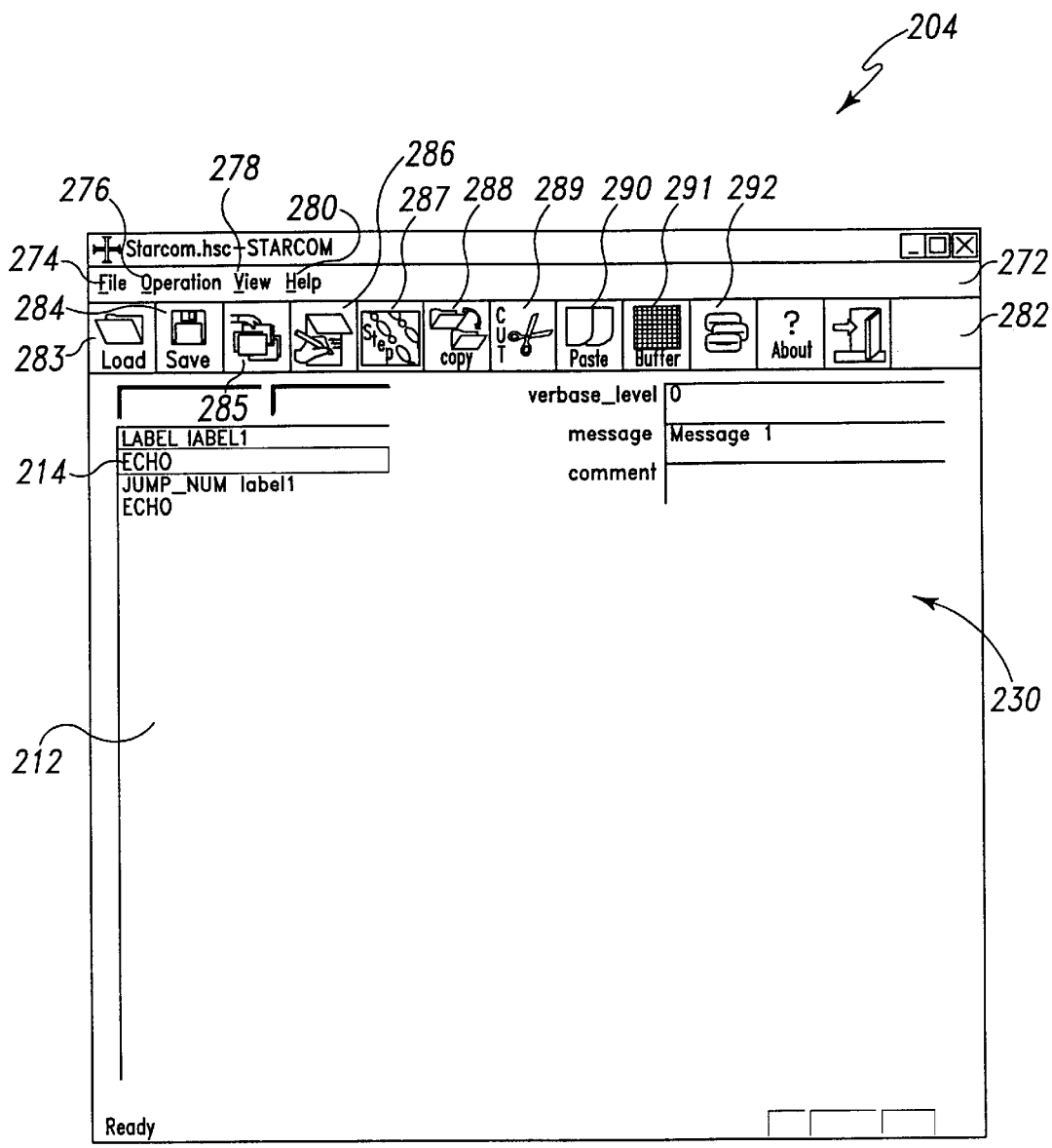
FIG. 3 illustrates a main application window of the scripting tool shown in FIG. 2.

The GUI 202 includes a test script window 210, a select command dialog window 220, a current command window 230, a status window 240, an edit window 250, a device list window 260, and a command center 270. In a preferred embodiment of the present invention, the test script window 210, the current command window 230, and the command center 270 are combined to form a main application window 204. The main application window 204 is illustrated in FIG. 3. In a preferred embodiment of the present invention, the computer 100 displays the main application window 204 in response to the processor 102 executing a scripting tool application stored in the memory 104. In general, the main application window 204 is operable to (i) provide a user with information concerning a test script, and (ii) provide a user with an interface to the other elements of the GUI 202.

Specifically, the test script window 210 of the main application window 204 is operable to display a test script. The test script window 210 includes a list box control 212 that is operable to display each script command defining the test script. The list box control 212 is also operable to receive user input via a user input device 110 such as a mouse and/or a keyboard. In particular, the list box control 212 is operable to (i) receive user input, (ii) move a highlight bar 214 in response to the user input, and (iii) identify to the processor 102 the script commands of the test script that are highlighted by the highlight bar 214.

The current command window 230 of the main application window 204 is operable to display the parameters and parameter values of the script command currently highlighted in the test script window 210. For example, as a result of the ECHO script command being highlighted in the list box control 212, the current command window 230 displays the parameters and parameter values currently associated with the ECHO script command. In particular, the current command window 230 displays the verbose_level parameter with a value of 0, the message parameter set to "Message 1", and the comment parameter set to the null string of "". Moreover, in a preferred embodiment of the present invention, the current command window 230 is a view only window. In other words, the current command window 230 is operable to display the parameters and parameter values of the highlighted script command, but is not operable to receive user input for editing the parameter values of the highlighted script command.

The command center 270 as illustrated in FIG. 3 includes a menu bar 272 and a tool bar 282. In general, the menu bar 272 provides a drop-down menu interface to trigger execution of various scripting tool commands, and the tool bar 282 provides a push button interface to trigger execution of common scripting tool commands. In particular, the menu bar 272 in a preferred embodiment of the present invention includes a file drop-down menu 274, an operation drop-down menu 276, a view drop-down menu 278, and a help drop-down menu 280.

The file drop-down menu 274 provides a user with an interface to trigger execution of file manipulation commands. In particular, the file drop-down menu 274 provides menu selections for triggering execution of a load test script command, a save test script command, and a print test script command. The load test script command, when executed, provides a user with an interface to load a previously saved test script into the test script window 210. The save test script command, when executed, provides a user with an interface to save the test script displayed in the test script window 210 to a computer readable medium such as a disk drive. The print test script command, when executed, provides the user with an interface to print the test script displayed in the test script window 210 to a printer (not shown) of the computer system 100. In a preferred embodiment of the present invention, a load button 283 of the tool bar 282 provides an alternative mechanism for triggering execution of the load test script command, and a save button 284 of the tool bar 282 provides an alternative mechanism for triggering execution of the save test script command.

The file drop-down menu 274 also provides a user with an interface to a log file 290 (see FIG. 2) in which the scripting tool 200 records status information. In particular, the file drop-down menu 274 provides menu selections for triggering execution of a view log file command, and a clear log file command. The view log file command, when executed, cause the scripting tool 200 to display the contents of the log file 290, and the clear log file command, when executed causes the scripting tool 200 to clear the contents of the log file 290.

The operation drop-down menu 276 of the menu bar 272 provides a user with an interface to trigger execution of script editing commands. In particular, the operation drop-down menu 276 provides menu selections for triggering execution of a delete command, a cut command, a copy command, a paste command, an insert command, and an edit command. The delete command, when executed, removes the script command or commands highlighted in the test script window 210 from the test script. The cut command, when executed, removes the script command or commands highlighted in the test script window 210 from the test script, and stores the removed script commands in a buffer area referred to as the clipboard in the Windows NT environment. The copy command, when executed, stores in the clipboard a copy of the script command or commands highlighted in the test script window 210. The paste command, when executed, inserts a copy of the script command or commands stored in the clipboard at the insertion point highlighted in test script window 210 by the highlight bar 212.

In a preferred embodiment of the present invention, a copy button 288 of the tool bar 282 provides an alternative mechanism for triggering execution of the copy command. Similarly, a cut button 289 of the tool bar 282 provides an alternative mechanism for triggering execution of the cut command. Likewise, a paste button 290 of the tool bar 282 provides an alternative mechanism for triggering execution of the paste command.

Figure 4:
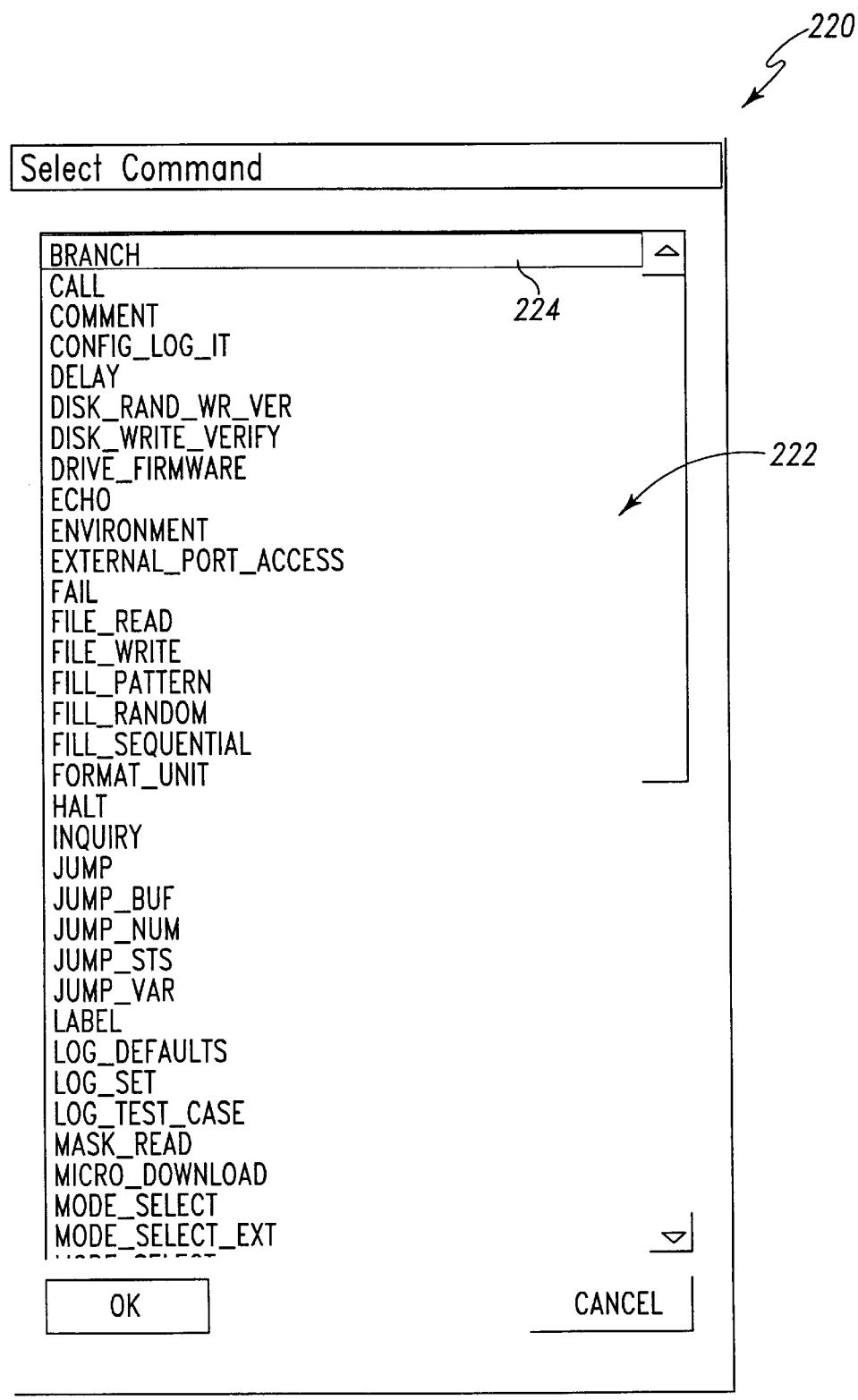
FIG. 4 illustrates a select command window of the scripting tool shown in FIG. 2.

The insert command, when executed, provides a user with an interface to insert a script command into the test script displayed in the test script window 210. In particular, in response to execution of the insert command, the scripting tool 200 displays the select command window 220 of the GUI 202. The select command window 220 is illustrated in FIG. 4. The select command window 220 includes a list box control 222 that is operable to display script commands for generating and executing SCSI common descriptor blocks (CDB), initializing the test environment, handling and recovering from errors, performing file I/O operations, and manipulating buffers. (See Appendix A for a detailed description of the script commands supported by a preferred embodiment of the present invention.) The list box control 222 of the select command window 210 is also operable to (i) receive user input, (ii) move a highlight bar 224 in response to the user input in order to select a script command displayed in the list box control 222, and (iii) identify the selected script command to the processor 102 so that the processor 102 may insert the selected script command into the test script. In particular, the processor 102 inserts the selected script command into the test script at an insertion point indicated in the test script window 210 by the highlight bar 214. In a preferred embodiment of the present invention, an insert button 285 of the tool bar 282 provides an alternative mechanism for triggering execution of the insert command.

Figure 5:
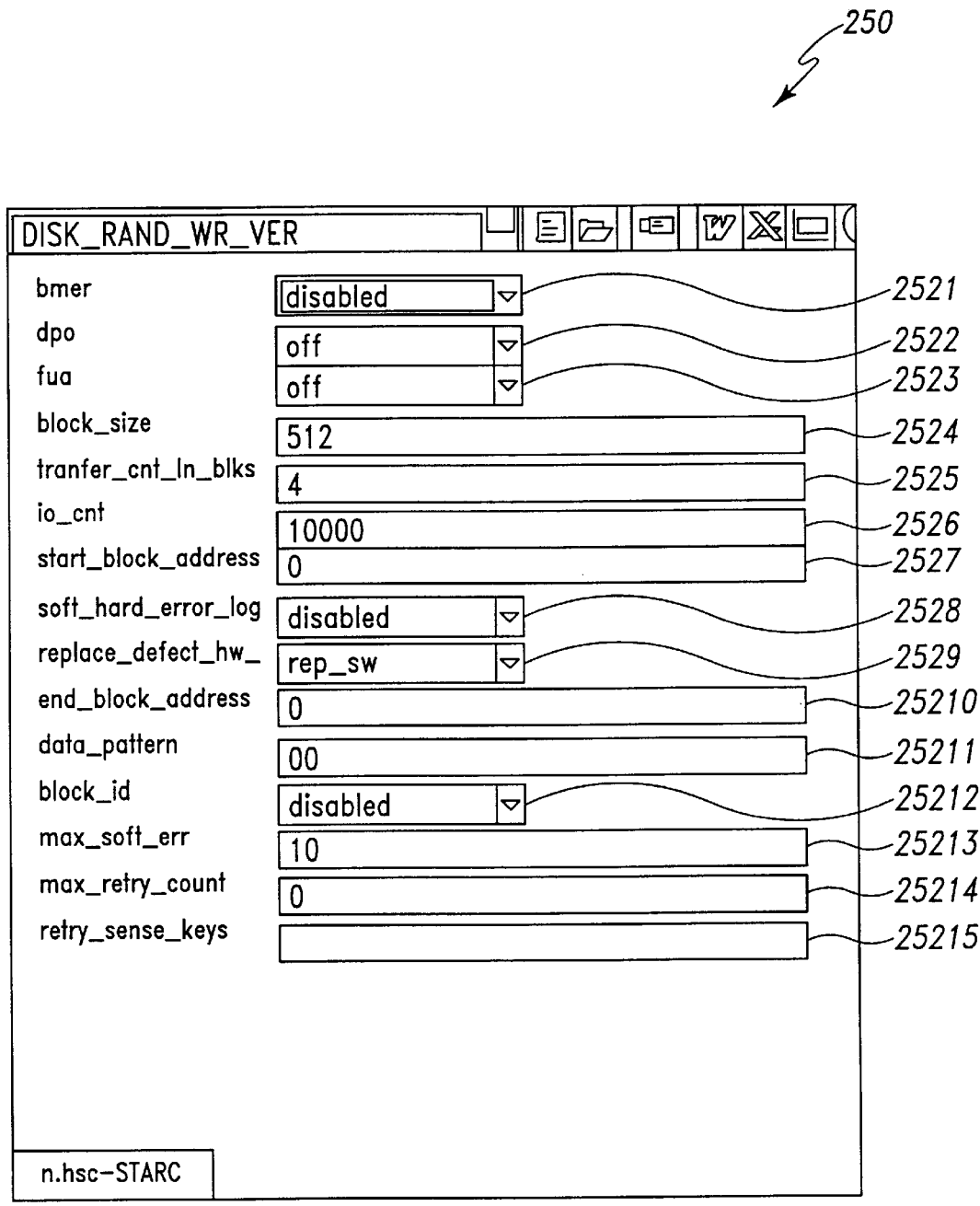
FIG. 5 illustrates an edit window of the scripting tool shown in FIG. 2.

The edit command, when executed, provides a user with an interface for editing parameter values of a script command of the test script. In particular, the edit command, when executed, provides a user interface for editing parameter values of the script command highlighted in the test script window 210 with the highlight bar 214. As illustrated in FIG. 5, when the edit command is executed, the scripting tool 200 generates based upon a definition file 292, an edit window 250 that includes user input controls $252_1$, $252_2$. . . $252_{15}$ for each parameter of the highlighted script command. In particular, the user input controls $252_1$, $252_2$. . . $252_{15}$ are operable to (i) identify each parameter of the highlighted script command, and (ii) display the current parameter value for each parameter. Moreover, the user input controls $252_1$, $252_2$. . . $252_{15}$ are operable to (i) receive user input, (ii) change corresponding parameter values based upon the user input, and (iii) identify the changed parameter values to the processor 102 so that the processor 102 may set the corresponding parameters of the highlighted script command equal to the changed parameter values. In a preferred embodiment of the present invention, an edit button 286 of the tool bar 282 provides an alternative mechanism for triggering execution of the edit command.

The operation drop-down menu 276 also provides a user with an interface to trigger script execution commands. In particular, the operation drop-down menu 276 provides menu selections for triggering execution of an execute command, a step command, and an auto execute command. The execute command, when triggered, causes the scripting tool 200 to (i) execute the script command or commands that are highlighted in the test script window 210 by the highlight bar 214, and (ii) leave the selected script commands highlighted with the highlight bar 214 after execution.

Similarly, the step command, when triggered, causes the scripting tool 200 to (i) execute the script command or commands highlighted in the test script window 210 by the highlight bar 214, and (ii) move the highlight bar 214 such that the highlight bar 214 highlights the script command following the executed script commands. In other words, the difference between the execute command and step command is that the location of the highlight bar 214 changes in response to the step command but remains in place in response to the execute command. In a preferred embodiment of the present invention, a step button 287 of the tool bar 282 provides an alternative mechanism for triggering execution of the step command.

The auto execution command, when triggered, causes the scripting tool 200 to execute the script commands of the test script. In particular, the auto execution command when triggered cause the scripting tool 200 to start executing the test script from the script command highlighted in the test script window 210 and to continue executing the script commands of the test script until the last script command of the test script is executed. In a preferred embodiment of the present invention, a user may halt execution of the test script during auto execution of the test script by entering appropriate user input such as pressing the <Esc>key.

The operation drop-down menu 276 also provides a user with an interface to an I/O data buffer. In particular, the operation drop-down menu 276 provides a menu selection for triggering execution of an edit I/O data buffer command. The edit I/O data buffer command, when executed, causes the scripting tool 200 to display the contents of the I/O data buffer, and provide a user with an interface for editing the contents of the I/O data buffer. In a preferred embodiment of the present invention, an edit data buffer button 291 of the tool bar 282 provides an alternative mechanism for triggering execution of the edit I/O data buffer command.

Figure 6:
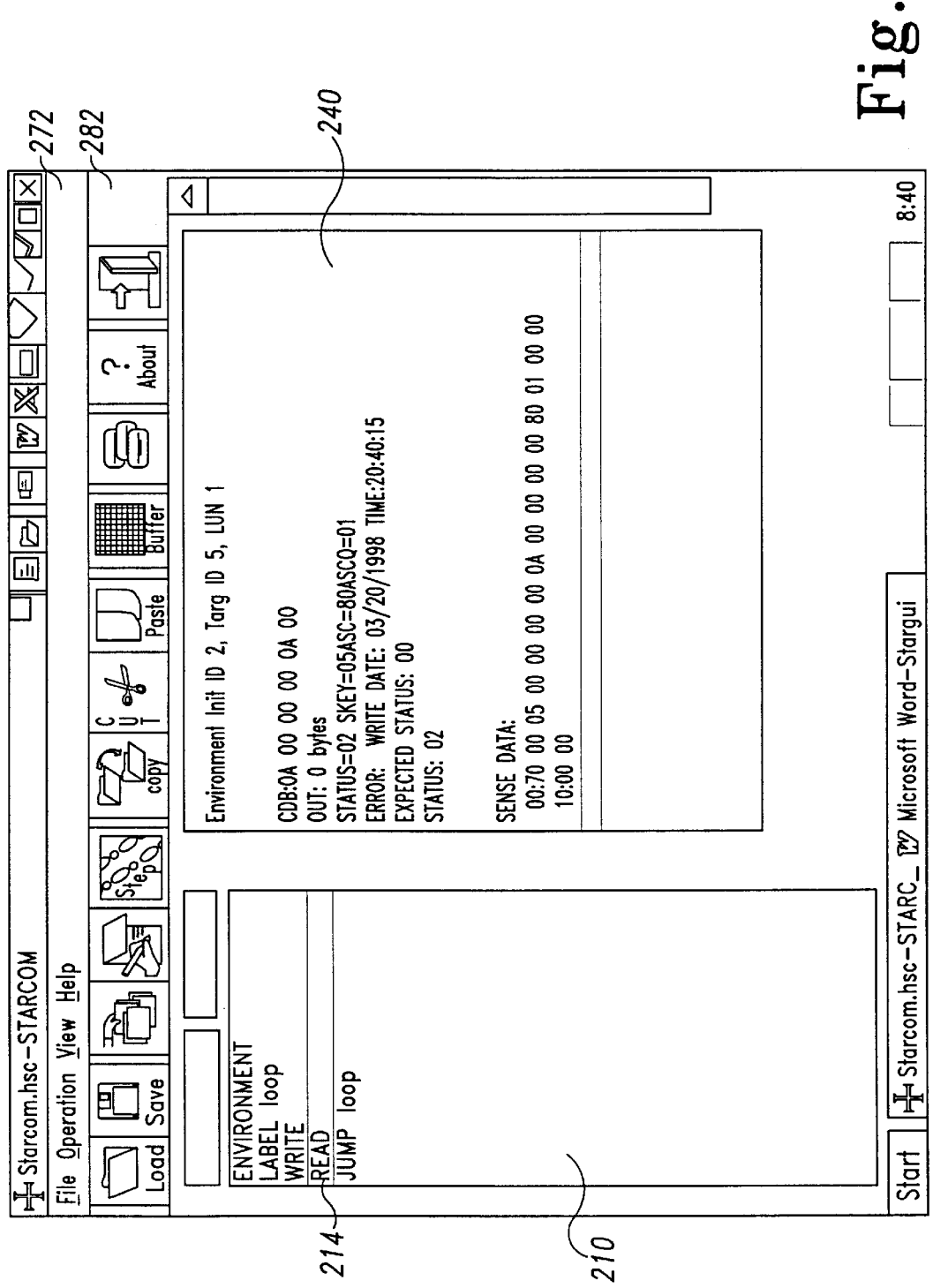
FIG. 6 illustrates a status window of the scripting tool shown in FIG. 2.

The operation drop-down menu 276 also provides a user with an interface to a status window 240. The status window 240 is operable to display status information and SCSI sense data resulting from execution of script commands. In a preferred embodiment of the present invention, the scripting tool 200 displays the status window 240 such that the status window 240 hides or replaces the current command window 230 (see FIG. 6). In this manner, the scripting tool 200 allows simultaneous display of the test script window 210 and the status information generated from the test script. In a preferred embodiment, the scripting tool 200 uses this simultaneous display to provide a visual correspondence between status information and the script command causing the status information by moving the highlight bar 214 in the test script window 210 as the script is executed. For example, due to the position of the highlight bar 214 in FIG. 6, a user can easily ascertain that the information displayed in the status window 240 resulted from execution of the test script up to the READ script command.

Moreover, in a preferred embodiment, the scripting tool 200 stores in the log file 290 and displays in the status window 240 certain status information resulting from execution of the test script and does not store and does not display other status information resulting from execution of the test script based upon a verbose level configuration setting. In particular, if the verbose level configuration setting is equal to 0, then the scripting tool 200 stores in the log file 290 and displays in the status window 240 error messages resulting from execution of the test script commands. However, if the verbose level configuration setting is equal to 1, then the scripting tool 200 stores in the log file 290 and displays in the status window 240 not only error messages but also parameter file information. A verbose level of 2 results in the scripting tool 200 logging and displaying the status information of verbose level 2 plus command message information. Finally, a verbose level of 3 results in the scripting tool 200 logging and displaying the status information of verbose level 2 plus all other messages generated due to executing the test script.

The operation drop-down menu 276 of the menu bar 282 further provides a user with an interface to a device list command. In particular, the operation drop-down menu 276 provides a menu selection for triggering execution of a device list command. The device list command, when executed, causes a device list window 260 to be displayed. The device list window 260 provides a list of devices coupled to the computer system 100 that may be tested by the scripting tool 200. In a preferred embodiment of the present invention, the device list window 260 provides a list of SCSI devices that are coupled to the computer system 100 along with information pertinent to the SCSI device.

Figure 7:
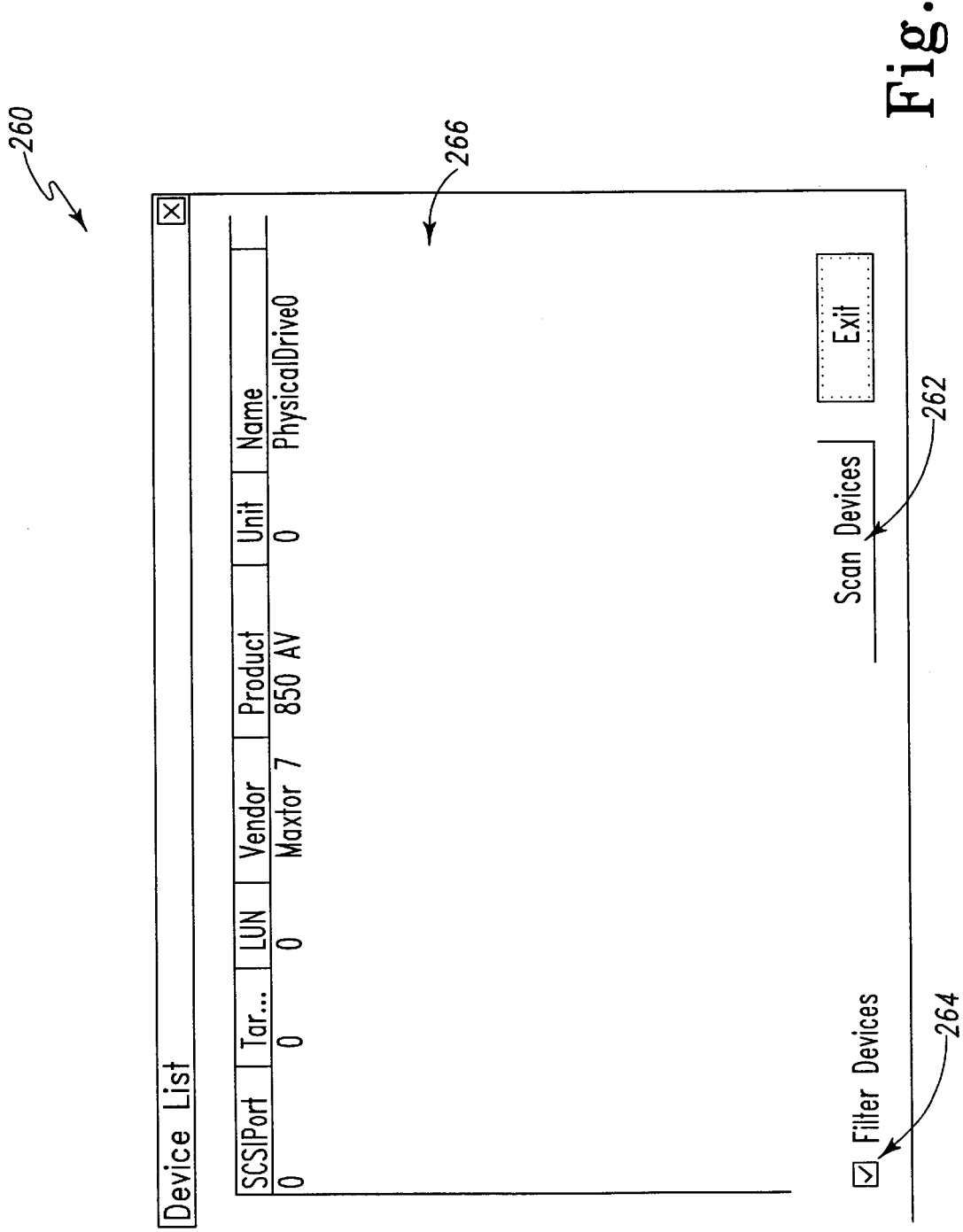
FIG. 7 illustrates a device list window of the scripting tool shown in FIG. 2.

For example, FIG. 7 illustrates in detail the device list window 260 of a preferred embodiment of the present invention. As illustrated, the device list window 260 includes a display window 266 which is operable to display in a columnar fashion for each SCSI device coupled to the computer system 100, the SCSI port value, the Target value, the LUN value, the Vendor string, the Product string, the Unit value, and the Name string obtained from each SCSI device.

The SCSI port value is the number that should be used for the Host ID parameter of the script commands shown in Appendix A. The SCSI port value is not actually the SCSI bus ID of the device, but is a number assigned to the SCSI device by the Windows NT operating system. The Target value and LUN value are the SCSI device's target ID and logical unit number respectively. The Vendor string and Product string provide vendor and product information obtained from the SCSI device via an inquiry command. The Unit value is a unique number used by the scripting tool 200 to access a given device. The Name string displays the internal name assigned to the SCSI device by the Windows NT operating system.

In order to obtain this information, the device list window 260 of FIG. 7 includes a scan devices button 262. The scan devices button 262 when selected by the user causes the scripting tool 200 to obtain the above device list information for the SCSI devices detected by the operating system of the computer system 100. In particular, the scan devices button 282 triggers the execution of standard SCSI inquiry commands (see Appendices A and C) in order to obtain the device list information from the SCSI devices. The device list window 260 also includes a filter check box 264. The filter check box 264 when checked causes the scripting tool 200 to filter out (i.e. not display) information obtained from SCSI devices that return non-standard inquiry information.

Scripting Tool Definition File

As stated above, the scripting tool 200 generates the edit window 250 based upon the script command highlighted in the test script window 210 and the definition file 292. In particular, the scripting tool 200 generates an edit window 250 for each script command that is based upon parameter and user input control definitions stored in the definition file 292. Portions of an exemplary definition file 292 are illustrated in FIG. 8. In general, the definition file 292 includes a command list section (lines 1–9) and several parameter definition sections (lines 11–125). The command list section lists each script command supported by the scripting tool 200. More specifically, the command list section associates each script command with a command number and a parameter definition section of the definition file 292. The command number is used by the scripting tool 200 to identify software routines that the scripting tool 200 needs to execute in order to perform the function of the script command associated with the command number.

For example, line 8 of the exemplary definition file 292 associates the DISK_RAND_WR_VER script command with command number 65. The scripting tool 200 includes software routines, identified by the command number 65, which when executed cause the scripting tool to perform the function defined by the DISK_RAND_WR_VER script command. In this manner, the software scripting tool 200 may associate the alterable parameter definition for the DISK_RAND_WR_VER script command with compiled software functions used to implement the DISK_RAND_WR_VER script command without requiring that the scripting tool software be rewritten and recompiled.

The command list section also associates the script command with a parameter definition section of the definition file 292. The scripting tool 200 utilizes the information of the associated parameter definition section to generate an edit window 250 for the associated script command. In a preferred embodiment of the present invention, the parameter definition section for each script command defines characteristics such as user input prompts, default parameter values, parameter value ranges, parameter value types, and user input control types for each parameter of the associated script command. Specifically, in a preferred embodiment, the parameter section is defined using a combination of the following keywords: NFIELD, PROMPT, INPUT_TYPE, LENGTH, VARIABLE_TYPE, TEXT, RANGE, CHOICES, RETURNS.

The NFIELD keyword is used to define the number of parameters or fields associated with the script command. For example, line 27 of the definition file 292 sets the NFIELD keyword equal to 15 in order to indicate that the DISK_RAND_WR_VER script command has 15 parameters.

The PROMPT keyword is used to define a prompt string for identifying the parameter in the edit window 250. For example, line 29 of the definition file 292 sets the PROMPT keyword for the first parameter of the DISK_RAND_WR_VER script command equal to the string "timer." As a result, the scripting tool generates the edit window 250 for DISK_RAND_WR_VER script command such that the string "timer" identifies the first field of the edit window 250. An exemplary edit window 250 for the DISK_RAND_WR_VER script command is illustrated in FIG. 5.

The INPUT_TYPE keyword is used to define a user input control type for the associated parameter of the script command. In a preferred embodiment of the present invention, the scripting tool 200 supports an edit box control type, and a combo box control type. In particular, the scripting tool 200 generates a user input control of the edit box control type in response to the INPUT_TYPE keyword being set equal to 0. An edit box control (i.e. a user input control of the edit box control type) allows a user to directly input data via a keyboard or other input device. Since line 62 of the definition file 292 sets the INPUT_TYPE keyword equal to 0, the scripting tool 200 generates an edit box control $252_6$ for the io_cnt parameter of the DISK_RAND_WR_VER script command so that a user may edit the parameter value associated with the io_cnt parameter.

The scripting tool 200 generates a user input control of the combo box control type in response to the INPUT_TYPE keyword being set equal to 1. Similar to the edit box control, a combo box control (i.e. a user input control of the combo box control type) allows a user to directly input data via a keyboard of other input device. However, the combo box control also (i) provides the user with a drop-down list of valid values from which the user may select, and (ii) limits the input to one of these valid values. Since line 30 of the definition file 292 sets the INPUT_TYPE keyword equal to 1, the scripting tool 200 generates a combo box control $252_1$ for the timer parameter of the DISK_RAND_WR_VER script command so that a user may edit the parameter value associated with the timer parameter.

It should be appreciated by those skilled in the art that while a preferred embodiment of the present invention utilizes an edit box control type, and a combo-box control type, the scripting tool 200 may be implemented to use other types of user input controls such as a radio-button control type, a check-box control type, and a list box control type.

The LENGTH keyword is used to define the number of characters that the user is allowed to enter via the associated edit box control. For example, line 63 of the definition file 292 sets the LENGTH keyword equal to 8. Accordingly, a user may only enter up to 8 characters into the edit box control $252_6$ used for the io_cnt parameter.

The VARIABLE_TYPE keyword is used to define an acceptable data type for the associated parameter. In particular, in the preferred embodiment, the VARIABLE_TYPE keyword may be set to either a string type, a numeric type, or a pattern type by setting the VARIABLE_TYPE keyword to 0, 1, or 2, respectively. If the VARIABLE_TYPE keyword is set equal to 0, then the corresponding user input control will allow a user to input a string of characters for the associated parameter. Similarly, if the VARIABLE_TYPE keyword is set equal to 1, then the corresponding user input control will allow a user to input a number for the associated parameter. Furthermore, if the VARIABLE_TYPE keyword is set equal to 2, then the corresponding user input control will allow a user to input a hexadecimal pattern for the associated parameter. Since line 65 of the definition file 292 sets the VARIABLE_TYPE keyword equal to 1, the scripting tool 200 only allows a user to input a number for the io_cnt parameter of the DISK_RAND_WR_VER script command.

The TEXT keyword is used to define a default value for the associated parameter. For example, since line 33 of the definition file 292 sets the TEXT keyword equal to disabled, the scripting tool 200 defaults the timer parameter of the DISK_RAND_WR_VER script command to a value of disabled. In other words, unless a user inputs another value for the timer parameter of the DISK_RAND_WR_VER script command, the timer parameter will have a value of disabled.

The RANGE keyword is used to define an allowable numeric range for the associated parameter. In particular, the RANGE keyword is used to define a minimum value and a maximum value for the associated parameter. For example, line 64 of the definition file 292 defines a minimum value of 0 and a maximum value of 3000000 for the io_cnt parameter of the DISK_RAND_WR_VER script command. Accordingly, the scripting tool 200 limits user input via the edit box control $252_6$ for the io_cnt parameter to values between and including 0 and 3000000.

The CHOICES keyword is used to define a list of allowable choices for the associated parameter. For example, line 31 of the definition file 292 sets the CHOICES keyword equal to a comma delimited list of enabled and disabled. Accordingly, the combo box control $252_1$ for the timer parameter of the DISK_RAND_WR_VER script command limits the user to choices of enabled and disabled.

The RETURNS keyword is used to define values to assign the associated parameter in response to choices selected via a combo box control. For example, line 31 of the definition file 292 sets the CHOICES keyword equal to a comma delimited list of enabled and disabled, and line 32 of the definition file 292 sets the RETURNS keyword equal to a comma delimited list of enabled and disabled. Accordingly, if a user selects enabled from the combo box control $252_1$ for the timer parameter of the DISK_RAND_WR_VER script command, then the scripting tool 200 sets the timer parameter equal to enabled. Similarly, if a user selects disabled from the combo box control $252_1$, then the scripting tool 200 sets the timer parameter equal to disabled.

Definition File Preprocessing

In the preferred embodiment of the present invention, the definition file 292 is a simple text file that may be edited with a common text editor. Parsing a text file in order to extract information from the text file can be time consuming and computationally intensive. Accordingly, in order to speed up execution of the scripting tool 200, the scripting tool 200 preprocesses the definition file 292. In particular, the scripting tool 200 preprocesses the definition file 292 to generate a binary definition file that represents the definition information of the definition file 292. Due to the structure of the binary definition file, the scripting tool 200 is able to extract parameter definition information from the binary definition file more quickly than parsing the definition file 292.

Figure 10:
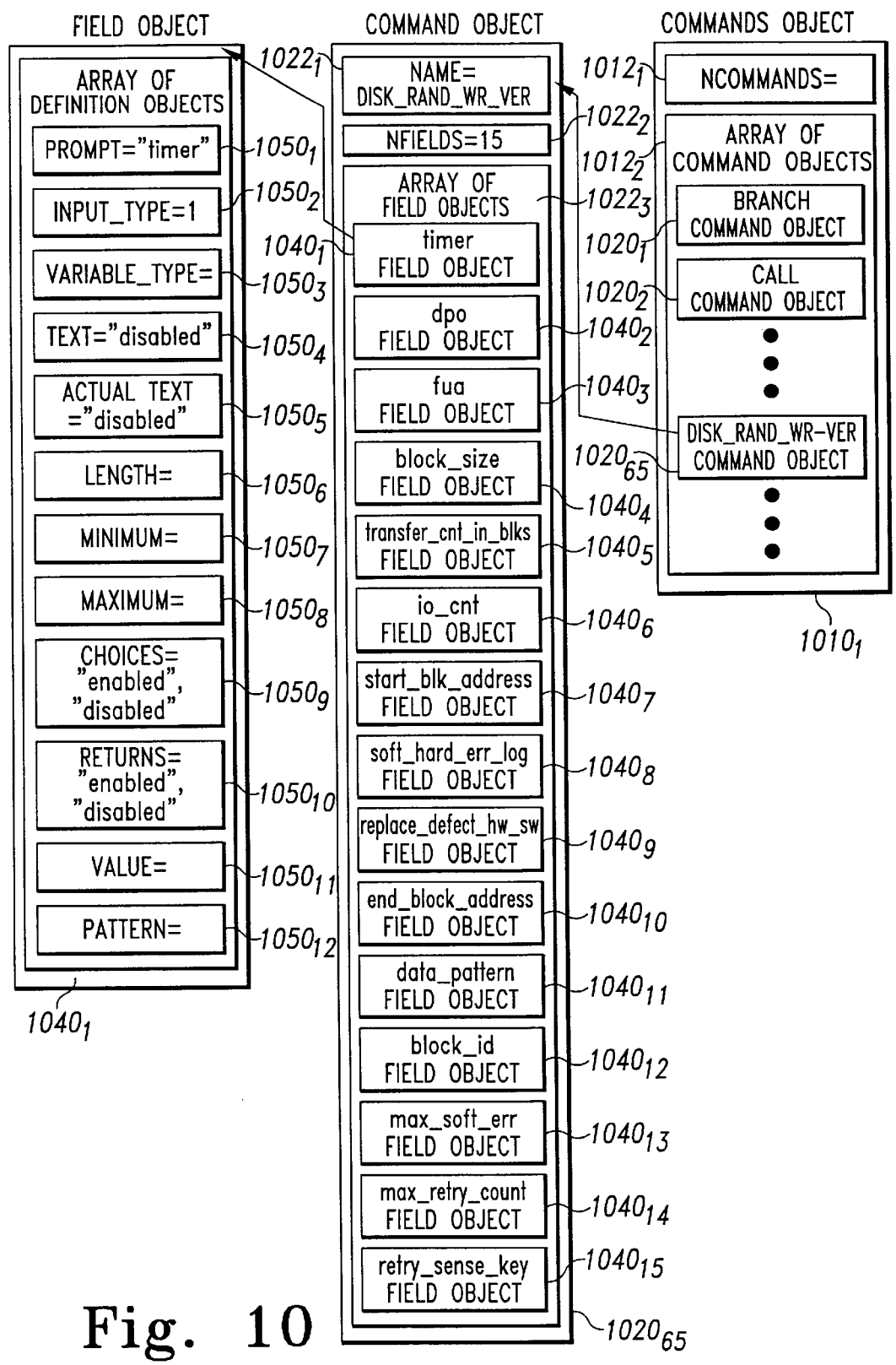
FIG. 10 illustrates a commands object built by the scripting tool shown in FIG. 2.

In particular, in a preferred embodiment of the present invention, the scripting tool 200 creates and saves a binary definition file which represents a commands object 1010 illustrated in FIG. 10. Specifically, the scripting tool creates the binary definition file such that the scripting tool may index the binary definition file in order to quickly obtain script command information contained in the commands object 1010. The commands object 1010 includes a NCOMMANDS field $1012_1$ and an array field $1012_2$. The NCOMMANDS field 1012 is used to store a value N that indicates the number of script commands defined in the definition file 292. The array field $1012_2$ is used to store an array of command objects $1020_1, 1020_2, \ldots 1020_N$. In particular, the array field contains a command object $1020_x$ for each script command defined in the definition file 292.

Each command object $1020_x$ in a preferred embodiment includes a NAME field $1022_1$, a NFIELDS field $1022_2$, and an array field $1022_3$. The NAME field $1022_1$ is used to store a string indicating a script command name for the script command associated with the command object $1020_x$. The NFIELDS field $1022_2$ is used to store a value M that indicates the number of parameters used by the script command represented by the command object $1020_x$. The array field $1022_3$ is used to store an array of field objects $1040_1, 1040_2, \ldots 1040_M$. In particular, the array contains a field object $1040_x$ for each parameter defined in the definition file 292 for the associated script command.

Each field object $1040_x$ in a preferred embodiment includes an array of definition objects $1050_1, 1050_2, \ldots 1050_{12}$. In particular, each field object $1040_x$ includes a PROMPT definition object $1050_1$, an INPUT_TYPE definition object $1050_2$, a VARIABLE_TYPE object $1050_3$, a TEXT definition object $1050_4$, an ACTUAL TEXT definition object $1050_5$, a LENGTH definition object $1050_6$, a MINIMUM definition object $1050_7$, a MAXIMUM definition object $1050_8$, a CHOICES definition object $1050_9$, a RETURNS definition object $1050_{10}$, a VALUE definition object $1050_{11}$, and a PATTERN definition object $1050_{12}$.

The PROMPT definition object $1050_1$ is used to store a string of the definition file 292 that is set equal to the PROMPT keyword. The INPUT_TYPE definition object $1050_2$ is used to store the value of the definition file 292 that is set equal to the INPUT_TYPE keyword. The VARIABLE_TYPE definition object $1050_3$ is used to store the value of the definition file 292 that is set equal to the VARIABLE_TYPE keyword.

The TEXT definition object $1050_4$ is used to store the string of the definition file 292 that is set equal to the TEXT keyword. The TEXT definition object $1050_4$ is also used to store a user input string for the parameter if the user edits the value for the associated parameter. If a user causes a variable to be stored in the TEXT definition object $1050_4$, then the ACTUAL TEXT definition object $1050_5$ is used to store the string represented by the variable stored in the TEXT definition object $1050_4$.

The LENGTH definition object $1050_6$ is used to store a value of the definition file 292 that is set equal to the LENGTH keyword. The MINIMUM definition object $1050_7$ is used to store a minimum value indicated by the RANGE keyword of the definition file 292, and MAXIMUM definition object $1050_8$ is used to store a maximum value indicated by the RANGE keyword of the definition file 292.

The CHOICES definition object $1050_9$ is used to store the choices list of the definition file 292 that is set equal to the CHOICES keyword. The RETURNS definition object $1050_{10}$ is used to store the returns list of the definition file 292 that is set equal to the RETURNS keyword.

The VALUES definition object $1050_{11}$ is used to store a numeric value for the parameter if the VARIABLE_TYPE definition object $1050_3$ indicates a numeric type. Similarly, the PATTERN definition object $1050_{12}$ is used to store a hexadecimal pattern for the parameter if the VARIABLE_TYPE definition object $1050_3$ indicates a pattern type.

Figure 9:
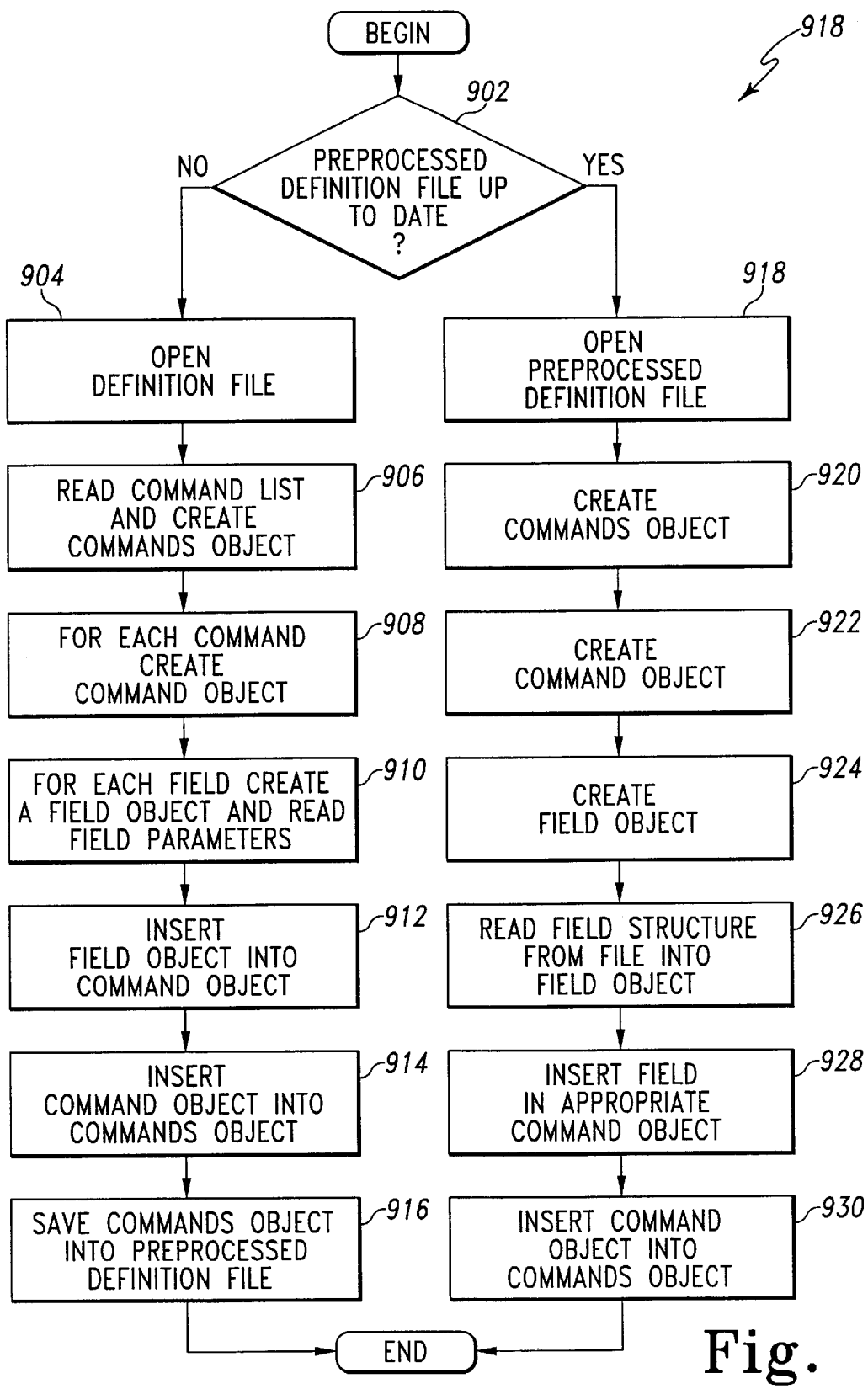
FIG. 9 illustrates a definition file processing procedure used by the scripting tool shown in FIG. 2.

FIG. 9 illustrates a definition file processing procedure 900 which is executed by the scripting tool 200 each time the scripting tool 200 is initialized in order to obtain the commands object 1010. In particular, the scripting tool 200 at step 902 determines whether the scripting tool 200 has an up to date preprocessed version of the definition file 292. Specifically, the scripting tool 200 determines whether the file system of the computer system 100 includes a binary definition file (i.e. a preprocessed definition file). If the file system does not include the binary definition file, then the scripting tool 200 proceeds to step 904 since the scripting tool 200 does not have access to a preprocessed up to date version of the definition file 292.

However, if the file system does include the binary definition file, then the scripting tool 200 compares a first file system time stamp associated with the definition file 292 to a second file system time stamp associated with the binary definition file. If the first file system time stamp indicates a later time than the second file system time stamp, then the scripting tool 200 determines that the binary definition file may be out dated. Accordingly, the scripting tool 200 proceeds to step 904 in order to process the definition file 292 and re-generate a preprocessed up to date version of the definition file 292.

In step 904, the scripting tool 200 opens the definition file 292. Then in step 906, the scripting tool 200 parses the command list section of the definition file 292 in order to obtain a list of commands defined in the definition file 292. Moreover, in response to obtaining the list of commands defined in the definition file 292, the scripting tool 200 creates a commands object 1000 (See. FIG. 10.) which is essentially a data structure for encapsulating both functions and data relating to script commands.

The script tool 200 in step 908 creates a command object $1020_x$ for each script command listed in the command list section of the definition file 292. In step 910, the script tool 200 parses the parameter definition sections for each script command and creates a field object $1040_x$ for each parameter defined by the definition file 292. In particular, the scripting tool 200 creates each field object $1040_x$ such that the field object $1040_x$ represents the parameter as defined in the definition file 292.

In step 912, the scripting tool 200 stores the created field objects $1040_x$ into their respective command objects $1020_x$, and in step 914 stores the created command objects $1020_x$ into the commands object 1010. As a result of the above processing of the definition file 292, the scripting tool 200 has obtained a commands object 1010 that includes a command object $1020_x$ for each of the script commands listed in the definition file 292. The commands object 1010 essentially is a structured binary representation of the parameter definition information of the definition file 292. Accordingly, the scripting tool 200 may efficiently obtain from the commands object 1020, parameter information concerning any script command of the scripting tool 200. In order to eliminate reprocessing of the definition file 292 every time the scripting tool 200 is initialized, the scripting tool 200 in step 916 saves a binary representation of the commands object 1010 in a binary definition file. In particular, the scripting tool 200 creates the binary definition file such that the scripting tool 200 may index the binary definition file in order to quickly obtain specific definition information from the binary definition file.

If the scripting tool in step 902 determines that the file system of the computer 100 does include a binary definition file representing a preprocessed up to date version of the definition file 292, then the scripting tool 200 proceeds to step 918. In step 918, the scripting tool 200 opens the binary definition file in order to obtain parameter definition information for the scripting commands of the scripting tool 200. Then in step 920, the scripting tool 292 instantiates a commands object 1010 into which the scripting tool 292 may store command objects $1020_x$. In step 922, the scripting tool 292 determines from the binary definition file the number of defined script commands and instantiates a command object $1020_x$ for each defined script command. Similarly, in step 924, the scripting tool 292 determines from the binary definition file the number of defined parameters and instantiates a field object $1040_x$ for each defined parameter of the binary definition file.

The scripting tool 200 in step 926 instantiates a definition object $1050_x$ for each keyword definition of the binary definition file, and stores the keyword definition information into the instantiated definition objects $1050_x$. The scripting tool 200 then stores the definition objects $1050_x$ into appropriate field objects $1020_x$.

In step 928, the scripting tool 200 stores the created field objects $1040_x$ into the appropriate command object $1020_x$. For example, the scripting tool 200 stores the timer field object $1040_1$ in the DISK_RAND_WR_VER command object $1020_{65}$. Then, in step 930, the scripting tool 200 stores the created command objects $1020_x$ into the commands object 1010.

It should be appreciated that the scripting tool 200 builds the same commands object 1010 whether the scripting tool 200 builds the commands object 1010 from the definition file 292 or builds the commands object 1010 from the binary definition file. However, if the scripting tool 200 builds the commands object 1010 from the definition file 292, then the scripting tool 200 must parse the definition file 292 in order to obtain the parameter definition information contained in the definition file 292. On the other hand, if the scripting tool 200 builds the commands object 1010 from the binary definition file, then the scripting tool 200 may directly index definition information contained within the binary definition file. Indexing data on a whole is much quicker than parsing a text file to obtain the same data. Accordingly, the scripting tool 200 in the preferred embodiment utilizes the binary definition file to build the commands object 1010 if the binary definition file is up to date with the parameter information contained in the definition file 292.

Generic Host Adapter Interface

Figure 11:
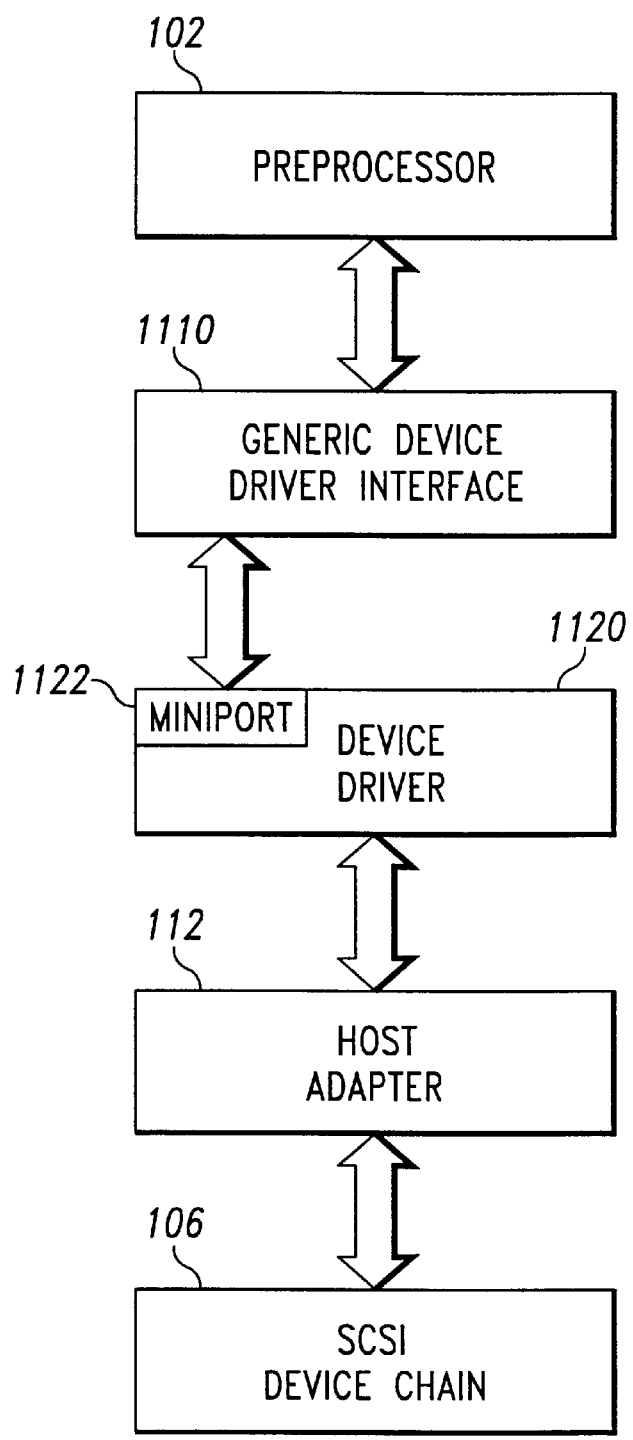
FIG. 11 illustrates a generic interface used by the scripting tool shown in FIG. 2.

Several scripting commands of the scripting tool 200 require that data be written to and received from the SCSI devices 106 coupled to the host adapter 112. In a preferred embodiment of the present invention, the scripting tool 200 utilizes a generic host adapter interface which is illustrated in FIG. 11. As a result of utilizing the generic host adapter interface of FIG. 11, the scripting tool 200 is operable to test multiple types of host adapters and SCSI devices.

As illustrated in FIG. 11, the scripting tool 200 utilizes a device driver 1120 in order to communicate with the host adapter 112 and the SCSI device chain 106. In particular, the device driver 1120 is coded specifically for providing a communication interface to the host adapter 112. In other words, the device driver 1120 is operable to provide a communication interface to host adapters that are of the same make and model as the host adapter 112, but the device driver 1120 may be inoperable to provide a communication interface to any host adapter that is not completely compatible with the host adapter 112.

In order to extend the functionality of the scripting tool 200, the scripting tool 200 utilizes a generic device driver interface 1110. The generic device driver interface 1110 provides the processor 102 of the scripting tool 200 with a consistent interface for communicating with device drivers of many types. In a preferred embodiment of the present invention, the generic device driver interface 1110 is provided by the DeviceIoControl function of the Microsoft Win32 API. (See Appendix B & C for further details.) The DeviceIoControl function provides the processor 102 with a mechanism for controlling the host adapter 112 via a SCSI miniport interface 1122 of the device driver 1120.

Utilizing the generic device driver interface 1110 extends the scope of host adapters and devices that the scripting tool 200 may test. In other words, if a host adapter has a device driver that provides an interface accessible by the generic device driver interface 1110, then the scripting tool 200 should be operable to test the host adapter and devices coupled thereto. Since most SCSI device drivers for Windows NT include a SCSI miniport interface, a preferred embodiment of the scripting tool 200 which utilizes the DeviceIoControl function should be able to test most host adapters and SCSI device that are compatible with the Windows NT operating system.

General Operation of Scripting Tool

Figure 12:
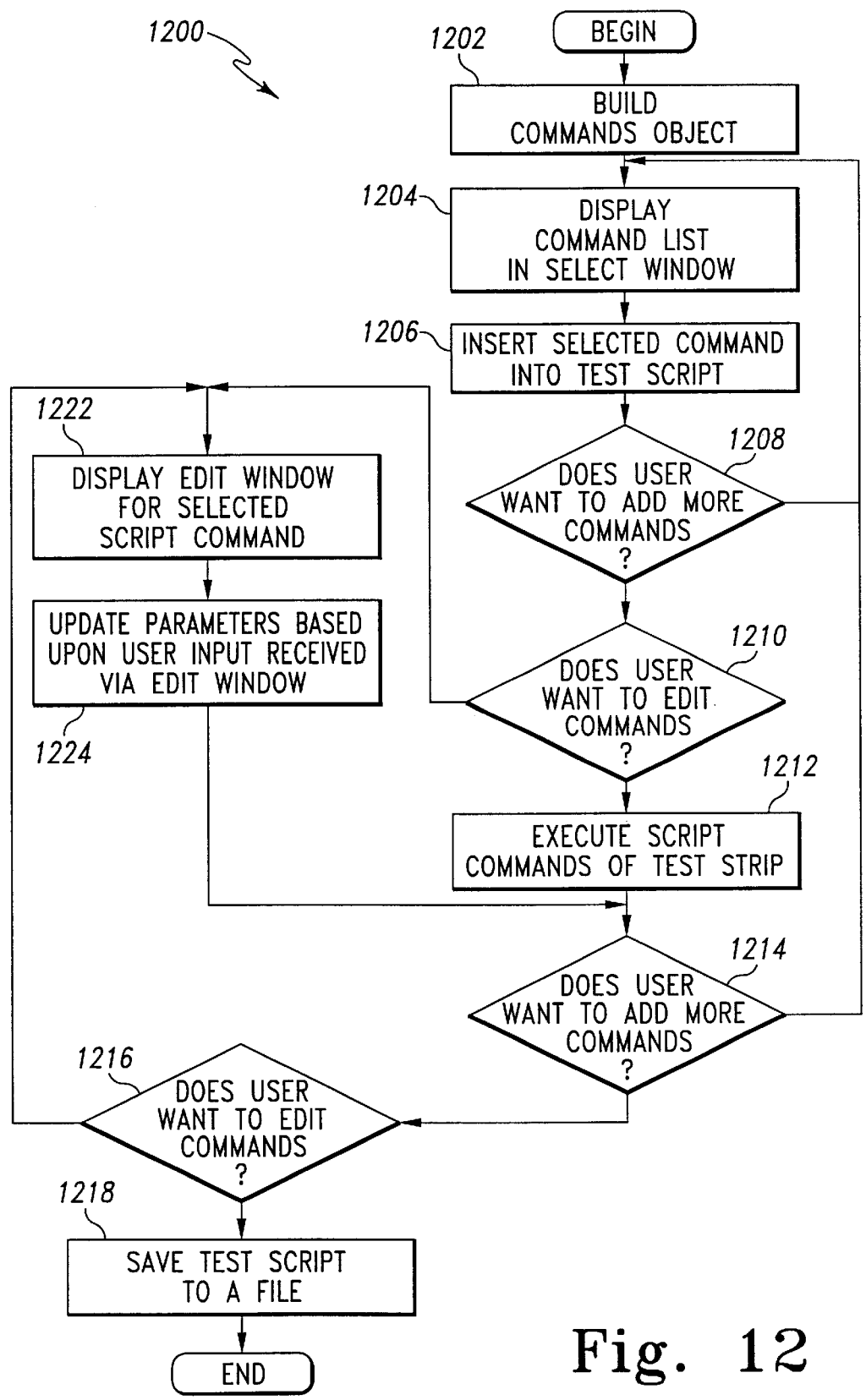
FIG. 12 illustrates a flow chart of a basic operating procedure implemented by the scripting tool shown in FIG. 2.

A basic operational procedure 1200 is illustrated in FIG. 12 in order to provide a basic understanding of how a user may generate and execute a test script via the scripting tool 200. It should be appreciated by those skilled in the art that the following description only describes a portion of the operation of the scripting tool 200. Due to the interactive interface provided by the scripting tool 200, a detailed description of every possible user input and resulting scripting tool response would likely be more confusing than helpful. Furthermore, one skilled in the art may glean much of the detailed operation of the scripting tool 200 from the above description of the GUI 202 and general knowledge of Windows applications.

In step 1202, the scripting tool 200 generates the commands object 1010 based upon the definition file 292. (See FIG. 9 and accompanying description.) As described above, the scripting tool 1202 in a preferred embodiment builds the commands object 1010 each time the scripting tool application is executed on the computer system 100. Moreover, the scripting tool 200 generates a test object in which may be stored command objects 1020. As will be discussed in more detail below, the test object defines the current test script for the scripting tool 200. Accordingly, upon execution of the scripting tool application, the scripting 200 generates an empty test object for storing a later defined test script.

Once the application is running and the commands object 1010 is built, a user is presented with the main application window 204 shown in FIG. 3. The user may then cause the scripting tool 200 to perform various actions via user input to the test script window 210 or the command center 270. In particular, if the user selects the insert button 285 of the toolbar 282, presses the <Insert> key, or selects the insert command from the operation menu 276, then the scripting tool 200 in step 1204 presents the user with the select command window 220 shown in FIG. 4. More specifically, the scripting tool 200 generates the select command window 220 based upon the NAME fields $1022_1$ of each command object $1020_x$ stored in the commands object 1010, and displays the generated select command window 220 upon the display device 108.

The user may then select a script command from the select command window 220. In response to the user selecting a script command from the script command window 220, the scripting tool 200 determines which script command the user selected, and instantiates a new copy of the command object $1020_x$ stored in the commands object 1010 which represents the selected command. Moreover, the scripting tool 200 stores the newly instantiated copy of the command object 1020 in the an appropriate location of the test object, and inserts the string stored in the NAME field $1022_1$ in the test script window 210.

After the scripting tool 200 inserts the new command object 1020 into the test object and places the NAME string in the appropriate location of the test script window 210, the scripting tool 200 removes the select command window 220 from the display device 108, thus returning the user to the main application window 204. Then the scripting tool 200 in step 1208 determines whether the user desires to enter another script command into the test script displayed in the test script window 210. In particular, the scripting tool 200 determines whether the user has selected the insert button 285 of the toolbar 282, pressed the <Insert> key, or selected the insert command from the operation menu 276. If the user has performed any of these actions, then the scripting tool 200 returns to step 1204 in order to allow the user to insert another script command into the test script at the location highlighted by the highlight bar 214. In this manner, the user is able to build a list of script commands that define a test script. Moreover, the scripting tool 200 is able to track the order and content of the script commands of the test script via command objects 1020 stored in the test object.

In step 1210, the scripting tool 200 determines whether the user desires to edit a script command of the test script. In particular, the scripting tool 200 determines whether the user has selected (i) the edit button 286 of the toolbar 282, or (ii) the edit command from the operation menu 276. If the user has performed one of these actions, then the scripting tool 200 in step 1222 displays an edit window 250 for the script command highlighted in the test script window 210. To this end, the scripting tool 200 determines from an index value that is based upon the location of the highlight bar 214 which command object 1020 of the test object corresponds to the script command that the user desires to edit. Then the scripting tool 200 generates the edit window 250 based upon the field objects 1040 of the command object 1020. FIG. 5 illustrates an appropriate edit window 250 for the DISK_RAND_WR_VER script command.

The scripting tool 200 in step 1224 receives user input via the user input controls $252_x$ of the edit window 250. In response to the user input, the scripting tool updates the corresponding definition objects $1050_x$ of the field objects $1040_x$. In this manner, the scripting tool 200 is able to maintain and the user is able to edit the parameter values for the script commands comprising the test script.

In step 1212, the scripting tool 200 executes the test script displayed in the test script window 210. In particular, the scripting tool 200 executes appropriate software routines based upon the command objects 1020 stored in the test object. More specifically, if the user indicates that the scripting tool should execute the complete test script, then scripting tool 200 reads each command object 1020 stored in the test object, determines functions to execute in order to perform the operations of the script command associated with command object 1020, and passes parameter values of the command object 1020 to the appropriate functions.

As a result of executing the test script, the scripting tool 200 generates test information such as comment information, SCSI CDB information, SCSI sense data, and error messages. The scripting tool 200 stores the test information in the log file 290 so that the user may later inspect the test information. Furthermore, the scripting tool 200 displays the test information in is the status window 240 so that the user may see the test information during execution of the test script. In a preferred embodiment, the scripting tool 200 automatically displays the status window 240 during execution of the test script, and updates the highlight bar 214 such that the highlight bar 214 highlights the script command currently being executed by the scripting tool 200.

After execution of the test script the user may desire to add addition script commands to the test script or edit existing script commands of the test script. (steps 1214 and 1216). Moreover, the user may desire to save the test script to a file so that the test script may be executed at later time. In particular, the scripting tool 200 in step 1218 generates a binary file that represents the information stored in the test object. More specifically, the scripting tool 200 generates the binary file such that the scripting tool 200 may later read the binary file and regenerate the test object from the contents of the binary file.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while reference as been made the to Windows NT operating system, the scripting tool 200 may be implemented under other operating systems. Moreover, while the scripting 200 has been described in conjunction with testing SCSI devices, features of the present invention may be utilized in other scripting tools and in other testing environments Appendix A The following is a description of each command supported by a prototype of the present invention. Certain parameters of the following commands are listed as "Currently not implemented." While these parameters have yet to be implemented in the prototype of the present invention, implementation of these parameters are not necessary in order to effectively practice features of the present invention. Moreover, one skilled in the art in light of the following descriptions would be able to implement these parameters without undue experimentation.

Following each command is a list showing the parameter names, range of values, and description. If a field is set to '*' as a value then the default will be used. For the ENVIRONMENT command the default values are set in the configuration. Most commands include a comment field which will allow up to 30 ASCII characters.

A.1 Comment Commands

This command is used to document test files and does not print into the test log.

Comment

The first field allows up to seven ASCII characters which will print after the command name in the test file window. Ten additional lines of up to 70 ASCII characters each follow.

A.2 System Commands

Environment

Initialize/change SCSI environment (all fields default to those set in the system configuration)

| Parameter | Values | Description |
| --- | --- | --- |
| host_id | 0–99 | Host SCSI ID. |
| target_id | 0–99 | Target SCSI ID. |
| lun | 0–31 | Target Logical Unit Number. |
| width | 8, 16, or 32 | Data width in bits. Currently not implemented. |
| period | 0–999 | Transfer period (ns). Currently not implemented. |
| offset | 0–999 | REQ/ACK offset range. Currently not implemented. |
| xfer_mode | sync or async | Transfer mode synchronous or asynchronous. Currently not implemented. |
| messages | on or off | Allow messages if on. |
| Disconnect | on or off | Allow disconnect if on. |
| port | 0–99 | Port number for SCSI hardware. Currently not implemented. |
| block_size | 512 | Block size fixed at 512. |
| time_out | 0–16383 | Default time-out in seconds. |
| max_xfer_len_blk* | 0–1792 | Maximum data transfer length in blocks. See note below. |
| comment | 0–30 ASCII characters | |

*The maximum value of 1792 (0 x 700) is valid for the Symbios Logic 8751 host adapter. For other host adapters this value must be predetermined by the application user. This value can be determined either by trial and error or maybe this value is defined the owner's manual for the host adapter.

Reset

Reset the system's SCSI bus. Note: This command will only work on a Windows NT™ host with the Symbios Logic 8751 host adapter and the special device driver developed specifically for use with the STARCOM application.

| Parameter | Values | Description |
| --- | --- | --- |
| Comment | 0–30 ASCII characters | |

A.3 Error Handling

Recovery

Specifies the action to be taken when an unexpected error occurs.

| Parameter | Values | Description |
| --- | --- | --- |
| action | continue | Continue with the next command. |
| | file | Terminate the test and run the test file specified in the file field. |
| | halt | Halt execution on error. |
| file | 1–50 character string | Run this test file on error if action is set to file. |
| comment | 0–30 ASCII characters | |

A.4 SCSI Commands

The following commands are used to create and execute various SCSI Command Descriptor Blocks (CDB).

FORMAT_UNIT

The FORMAT UNIT command (op-code=0x04) formats the medium into initiator addressable logical blocks per the initiator defined options. In addition, the medium may be certified and control structures may be created for the management of the medium and defects.

| Parameter | Values | Description |
| --- | --- | --- |
| fast_format | yes or no | SYMBIOS vendor specific field. |
| format_data | yes or no | If yes there will be a DATA OUT phase. |
| complete_list | yes or no | Indicates whether the defect list is complete. |
| defect_list | 0–7 | Defect List Format. |
| interleave | 0–65535 | An interleave of zero specifies that the target uses its default interleave. An interleave of one specifies that consecutive logical blocks be placed in contiguous ascending order. All other values are vendor specific. |
| data_size | 0–16383 | Length of data transfer |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| comment | 0–30 ASCII characters | |

INQUIRY

The INQUIRY command (op-code=0x12) requests that information regarding parameters of the target and its attached peripheral devices be sent to the initiator.

| Parameter | Values | Description |
| --- | --- | --- |
| page_code | 0–255 | Specifies which page of vital product data information the target shall return. |
| evpd | off or on | Enable vital product data bit. If on specifies that the target shall return the optional vital product data specified by the page code field. If off specifies that the target shall return the standard INQUIRY data. |
| allocation_length | 0–255 | Length of data transfer. |
| data_direction | compare | Data transfer is compare data in with I/O data buffer. |

| Parameter | Values | Description |
|---|---|---|
| | in | Data transfer is in. |
| | mask | Data compare with mask (see MASK_READ). Mask is currently not implemented. |
| scsi_status | 0–99 | Expected completion status (default = 0) |
| allocation_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters | |

MODE_SELECT

The MODE SELECT command (op-code=0x15) provides a means for the initiator to specify medium, logical unit, or peripheral device parameters to the target.

| Parameter | Values | Description |
|---|---|---|
| page_format | yes or no | No indicates SCSI-1 parameters. Yes indicates that the MODE SELECT parameters are structured as pages. |
| save_parameters | yes or no | Yes indicates that pages shall be saved by the target. |
| parm_list_length | 0–16383 | The length in bytes of the mode parameter list that will be transferred to the target. |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| comment | 0–30 ASCII characters | |

MODE_SELECT_EXT

The MODE_SELECT_EXT command (op-code=0x55) provides a means for the initiator to specify medium, logical unit, or peripheral device parameters to the target.

| Parameter | Values | Description |
|---|---|---|
| page_format | yes or no | No indicates SCSI-1 parameters. Yes indicates that the MODE SELECT parameters are structured as pages. |
| save_parameters | yes or no | Yes indicates that pages shall be saved by the target. |
| parm_list_length | 0–16383 | The length in bytes of the mode parameter list that will be transferred to the target. |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| comment | 0–30 ASCII characters | |

MODE_SENSE

The MODE SENSE command (op-code=0x1A) provides a means for a target to report parameters to the initiator.

| Parameter | Values | Description |
|---|---|---|
| page_code | 0–255 | Specifies mode page to return. A value of 3F indicates that all mode pages implemented by the target shall be returned. |
| disable_block_des | yes or no | No indicates that the target may return zero or more block descriptors. Yes indicates that the target shall not return any block descriptors. |
| page_control | changeable | Mask of changeable parameters returned. |
| | current | Current mode parameters returned. |
| | default | Default mode parameters returned. |
| | saved | Saved mode parameters returned. |
| allocation_length | 0–65535 | Length of data transfer. |
| data_direction | compare | Data transfer is compare data in with buffer. |
| | in | Data transfer is in. |
| | mask | Data compare with mask (see MASK_READ). Mask is currently not implemented. |
| scsi_status | 0–99 | Expected completion status (default = 0) |
| allocation_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters | |

MODE_SENSE_EXT

The MODE_SENSE_EXT command (op-code=0x5A) provides a means for a target to report parameters to the initiator.

| Parameter | Values | Description |
|---|---|---|
| page_code | 0–255 | Specifes mode page to return. A value of 3F indicates that all mode |

| Parameter | Values | Description |
|---|---|---|
|  |  | pages implemented by the target shall be returned. |
| disable_block_des | yes or no | No indicates that the target may return zero or more block descriptors. Yes indicates that the target shall not return any block descriptors. |
| page_control | changeable | Mask of changeable parameters returned. |
|  | current | Current mode parameters returned. |
|  | default | Default mode parameters returned. |
|  | saved | Saved mode parameters returned. |
| allocation_length | 1–65535 | Length of data transfer. |
| data_direction | compare | Data transfer is compare data in with buffer. |
|  | in | Data transfer is in. |
|  | mask | Data compare with mask (see MASK_READ). Mask is currently not implemented. |
| scsi_status | 0–99 | Expected completion status (default = 0) |
| allocation_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters |  |

PASS_THROUGH

This command issues the Set Pass Through Mode (op-code=0x14). It will cause the next SCSI command to be passed directly to a disk attached to an array controller. The channel and device will default to the command line values unless they are set. If the target is a drive instead of an array then this command will be skipped instead of issued.

| Parameter | Values | Description |
|---|---|---|
| channel | 0–15 | SDAC channel (default set on command line or in the system configuration) |
| device | 0–15 | SDAC device (default set on command line or in the system configuration) |
| direction | in | Data transfer on next command is in. |
|  | none | No data transfer on next command (default). |
|  | out | Data transfer on next command is out. |
| allocation_length | 0–16383 | Length of data transfer of next command. (default = 0) |
| comment | 0–30 ASCII characters |  |

READ

The READ command (op-code=0x08) requests that the target transfer data to the initiator. The most recent data value written in the addressed logical block shall be returned.

| Parameter | Values | Description |
|---|---|---|
| address | 0–65535 | Logical block address to read from. |
| transfer_length | 0–255 | Length of data transfer in blocks (if this is set to a larger size than the I/O data buffer then a wrap to the beginning of the buffer will occur when the end is reached). |
| data_direction | compare | Data transfer is compare data in with buffer. |
|  | in | Data transfer is in. |
|  | mask | Data compare with mask (see MASK_READ). Mask is currently not implemented. |
| scsi_status | 0–99 | Expected completion status (default = 0) |
| data_size_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters |  |

READ_CAPACITY

The READ CAPACITY command (op-code=0x25) provides a means for the initiator to request information regarding the capacity of the logical unit.

| Parameter | Values | Description |
|---|---|---|
| scsi_status | 0–99 | Expected completion status (default = 0) |
| allocation_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |

-continued

| Parameter | Values | Description |
| --- | --- | --- |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters | |

READ_EXT

The READ_EXT command (op-code=0×28) requests that the target transfer data to the initiator. The most recent data value written in the addressed logical block shall be returned. Larger logical block addresses and transfer lengths are allowed than the READ command.

| Parameter | Values | Description |
| --- | --- | --- |
| address | 0–4294967295 | Logical block address to read from. |
| transfer_length | 0–1792 | Length of data transfer in blocks (if this is set to a larger size than the I/O data buffer then a wrap to the beginning of the buffer will occur when the end is reached). |
| data_direction | compare | Data transfer is compare data in with buffer. |
| | in | Data transfer is in. |
| | mask | Data compare with mask (see MASK_READ). Mask is currently not implemented. |
| scsi_status | 0–99 | Expected completion status (default = 0) |
| data_size_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| dpo | on | The target shall assign the logical blocks accessed by this command the lowest priority for being fetched into or retained by the cache. |
| | off | The priority shall be determined by the retention priority fields in the cache page. |
| fua | on | The target shall access the specified logical blocks from the media. |
| | off | The target may satisfy the command by accessing the cache memory. |
| comment | 0–30 ASCII characters | |

READ_LONG

The READ_LONG command (op-code=0×3E) requests that the target transfer data to the initiator. The data passed during the READ_LONG command is implementation specific, but shall include data bytes and the ECC bytes recorded on the medium. The most recent data written in the addressed logical block shall be returned. This command and the WRITE_LONG are provided to check the ECC capability of the device. Currently, this command is not supported by the Series 3 firmware on our disk array controllers. If you would like to issue this command to a SCSI-2 drive then use it in conjunction with the PASS_THROUGH command.

| Parameter | Values | Description |
| --- | --- | --- |
| address | 0–2147483547 | Logical block address to read from. |
| transfer_length | 0–32767 | Length of data transfer in blocks (if this is set |

-continued

| Parameter | Values | Description |
| --- | --- | --- |
| | | to a larger size than the I/O data buffer then a wrap to the beginning of the buffer will occur when the end is reached). |
| data_direction | compare | Data transfer is compare data in with buffer. |
| | in | Data transfer is in. |
| | mask | Data compare with mask (see MASK_READ). Mask is currently not implemented. |
| corrct | on | Causes the data to be corrected by ECC before being transferred to the initiator. |
| | off | Causes a logical block to be read without any correction made by the target. |
| scsi_status | 0–99 | Expected completion status (default = 0) |
| data_size_exact | yes or no | An error will be reported if this is set to yes and actual bytes transferred does not match the data size field value. Currently not implemented. |
| miscompare_type | = or <= | The first field determines if the following value is equal to or less than or equal to the number of miscompares allowed. |
| miscompares | 0–99 | Number of data miscompares allowed before an error is reported (default = 0). |
| unexp_disconnect | allow or no | An error will be reported if this is set to no and an unexpected disconnect occurs. |
| parity_error | allow or no | A parity error will be reported if this is set to no and one occurs. |
| comment | 0–30 ASCII characters | |

REQUEST_SENSE

The REQUEST SENSE command (op-code=0x03) requests that the target transfer sense data to the initiator.

| Parameter | Values | Description |
| --- | --- | --- |
| allocation_length | 0–255 | Length of data transfer. |
| aenp | on or off | Asynchronous Event Notification Polling. |
| data_direction | compare | Data transfer is compare data in with buffer. |
| | in | Data transfer is in. |
| | mask | Data compare with mask (see MASK_READ). Mask is currently not implemented. |
| scsi_status | 0–99 | Expected completion status (default = 0) |
| allocation_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| miscompare_type | = or <= | The first field determines if the following value is equal to or less than or equal to the number of miscompares allowed. |
| miscompares | 0–99 | Number of data miscompares allowed before an error is reported (default = 0). |
| parity_error | allow or no | A parity error will be reported if this is set to no and one occurs. |
| comment | 0–30 ASCII characters | |

SEND_CDB    General purpose command to create and execute any SCSI CDB.

| Parameter | Values | Description |
| --- | --- | --- |
| name | 0–30 ASCII characters | Specify a name for the CDB (optional) |
| cdb | 0–12 hex bytes | CDB where 2 characters specify each hex byte |

-continued

| Parameter | Values | Description |
|---|---|---|
| cdb_size | 6, 10, or 12 | CDB length in bytes (default = 6) |
| data_size | 1–2147483647 | Length of data transfer (if this is set to a larger size than the I/O data buffer then a wrap to the beginning of the buffer will occur when the end is reached). |
| data_type | bytes or blocks | Second data size field defines the previous number as in bytes or blocks. |
| data_direction | compare | Data transfer is compare data in with I/O data buffer. |
| | in | Data transfer is in. |
| | mask | Data compare with mask (see MASK_READ). Mask is currently not implemented. |
| | none | No data transfer (default). |
| | out | Data transfer is out. |
| timeout | 0–10000 | Maximum time (seconds) to wait for SCSI response |
| scsi_status | 0–255 | Expected completion status (default = 0 = good) |
| data_size_exact | yes or no | An error will be reported if this is set to yes and actual bytes transferred does not match the data_size field value. Currently not implemented. |
| unexp_disconnect | allow or no | An error will be reported if this is set to no and an unexpected disconnect occurs. |
| miscompare_type | = or <= | The first field determines if the following value is equal to or less than or equal to the number of miscompares allowed. |
| miscompares | 0–10 | Number of data miscompares allowed before an error is reported (default = 0). |
| parity_error | allow or no | A parity error will be reported if this is set to no and one occurs. |
| comment | 0–30 ASCII characters | |

TEST_UNIT_READY

The TEST UNIT READY command (op-code=0x00) provides a means to check if the logical unit is ready.

| Parameter | Values | Description |
|---|---|---|
| scsi_status | 0–99 | Expected completion status (default = 0) |
| unexp_disconnect | allow or no | An error will be reported if this is set to no and an unexpected disconnect occurs. |
| comment | 0–30 ASCII characters | |

VERIFY

The VERIFY command (op-code=0x2F) requests that the target verify the data written on the medium.

| Parameter | Values | Description |
|---|---|---|
| block_address | 0–65535 | Logical block address to verify. |
| parity_check | yes or no | Perform vendor unique parity check. |
| verification_len | 0–255 | The number of contiguous logical blocks of data that shall be verified. |
| scsi_status | 0–99 | Expected completion status (default = 0) |
| unexp_disconnect | allow or no | An error will be reported if this is set to no and an unexpected disconnect occurs. |
| comment | 0–30 ASCII characters | |

WRITE

The WRITE command (op-code=0x0A) requests that the target write the data transferred by the initiator to the medium.

| Parameter | Values | Description |
|---|---|---|
| address | 0–65535 | Logical block address to write to. |
| transfer_length | 0–255 | The number of contiguous logical blocks of data to transfer. (If this is set to a larger size than the I/O data buffer then a wrap to the beginning of the buffer will occur when the end is reached). |
| scsi_status | 0–99 | Expected completion status (default = 0) |
| data_size_exact | yes or no | An error will be reported if this is set to yes and actual bytes transferred does not match the data size field value. Currently not implemented. |

-continued

| Parameter | Values | Description |
| --- | --- | --- |
| unexp_disconnect | allow or no | An error will be reported if this is set to no and an unexpected disconnect occurs. |
| comment | 0–30 ASCII characters | |

WRITE_EXT

The WRITE_EXT command (op-code=0x2A) requests that the target write the data transferred by the initiator to the medium. Larger logical block addresses and transfer lengths are allowed than the WRITE command (6-byte).

| Parameter | Values | Description |
| --- | --- | --- |
| address | 0–4294967295 | Logical block address to write to. |
| transfer_length | 0–1792 | The number of contiguous logical blocks of data to transfer. (If this is set to a larger size than the I/O data buffer then a wrap to the beginning of the buffer will occur when the end is reached). |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| dpo | on | The target shall assign the logical blocks accessed by this command the lowest priority for being fetched into or retained by the cache. This overrides any retention priority specified in the cache page. |
| | off | The priority shall be determined by the retention priority fields in the cache page. |
| fua | on | The target shall access the specified logical blocks from the media. |
| | off | The target may satisfy the command by accessing the cache memory. |
| comment | 0–30 ASCII characters | |

WRITE_LONG

The WRITE_LONG command (opcode=0x3F) requests that the target write the data transferred by the initiator to the medium. The data passed during the WRITE_LONG command is implementation specific, but shall include the data bytes and the ECC bytes. Currently, this command is not supported by the Series 3 firmware on our disk array controllers. If you would like to issue this command to a SCSI-2 drive then use it in conjunction with the PASS_THROUGH command.

| Parameter | Values | Description |
| --- | --- | --- |
| address | 0–65535 | Logical block address to write to. |
| transfer_length | 0–255 | The number of contiguous logical blocks of data to transfer. (If this is set to a larger size than the I/O data buffer then a wrap to the beginning of the buffer will occur when the end is reached). |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| comment | 0–30 ASCII characters | |

WRITE_VERIFY

The WRITE AND VERIFY command (op-code=0x2E) requests that the target write the data transferred from the initiator to the medium and then verify that the data is correctly written. The data is only transferred once from the initiator to the target.

| Parameter | Values | Description |
|---|---|---|
| block_address | 0–65535 | Logical block address to write to and verify. |
| parity_check | yes or no | Perform vendor unique parity check. |
| transfer_length | 0–1792 | The number of contiguous logical blocks of data that shall be transferred and verified. (If this is set to a larger size than the I/O data buffer then a wrap to the beginning of the buffer will occur when the end is reached) |
| scsi_status | 0–99 | Expected completion status (default = 0) |
| data_size_exact | yes or no | An error will be reported if this is set to yes and actual bytes transferred does not match the data size field value. Currently not implemented. |
| unexp_disconnect | allow or no | An error will be reported if this is set to no and an unexpected disconnect occurs. |
| comment | 0–30 ASCII characters | |

A.5 Fill I/O Data Buffer

The following commands will fill the I/O data buffer with the specified data. All commands use the same I/O data buffer.

FILL_PATTERN

Fill buffer with a specified pattern.

| pattern Parameter | Values | |
|---|---|---|
| offset | 0–16383 | Byte offset in data buffer to start fill at (default is to start at offset 0 → leave field blank or set to 0) |
| data_size | 1–262144 | Number of bytes to fill (default is fill to end of buffer → leave field blank or set to 0) |
| comment | 0–30 ASCII characters | |

FILL_RANDOM

Fill data buffer with a random pattern.

| Parameter | Values | Description |
|---|---|---|
| seed | 0–16383 | Seed used by random number generator (default = 0) |
| offset | 0–16383 | Byte offset in data buffer to start fill at (default is to start at offset 0 → leave field blank or set to 0) |
| data_size | 1–262144 | Number of bytes to fill (default is fill to end of buffer → leave field blank or set to 0) |
| comment | 0–30 ASCII characters | |

FILL_SEQUENTIAL

Fill buffer with a sequential pattern.

| Parameter | Values | Description |
|---|---|---|
| sign | + or − | Specifies whether the increment value will be a positive (increment) or negative (decrement) value. |
| increment | 0–16383 | Value to add to each successive entry (default = 1) |
| span | 0–4 | Number of bytes that fill value will span (default = 1) |
| start | 0–262144 | Value to start fill with (default = 0) |
| offset | 0–16383 | Byte offset in data buffer to start fill at (default is to start at offset 0 → leave field blank or set to 0) |
| data_size | 0–2147483647 | Number of bytes to fill (default is fill to end of buffer → leave field blank or set to 0) |
| comment | 0–30 ASCII characters | |

4.2.6 File I/O

Read or write a file. The file size is determined from the operating system for READ_FILE, however, it will be truncated if it is larger than the I/O data buffer.

FILE_READ

Read a file into the I/O data buffer.

| file | 1–30 ASCII characters | File name with optional path (required) |
|---|---|---|
| comment | 0–30 ASCII characters | |

FILE_WRITE

Write data from the I/O data buffer to a file.

| file | 1–30 ASCII characters | File name with optional path (required) |
|---|---|---|
| file_size | 1–65535 | File size in bytes (required) |
| comment | 0–30 ASCII characters | |

A.7 Sdac Micro-Code and Drive Firmware Download

Micro-code may be downloaded to a disk array using this command. It is implemented internally using the WRITE BUFFER command.

DRIVE_FIRMWARE

This command can be used to download drive firmware.

| Parameter | Values | Description |
|---|---|---|
| file | 1–30 ASCII characters | Name of the firmware file. A path may be included. (required) |
| type | dac or drive | Select "dac" if the firmware will be downloaded through a disk array. Select "drive" if the firmware will be downloaded without the use of a disk array. In other words, if your host adapter is attached to a disk array then use "dac". |
| channel | 0–15 | If type field is "dac" then this is the channel the drive is located on within the disk array. Not used if type field is "drive". |
| device | 0–15 | If type field is "dac" then this is the SCSI ID of the drive on the channel specified by the channel field. Not used if type field is "drive". |
| spin_up | yes or no | Currently not implemented. |
| delay | 0–32767 | The number of milliseconds to wait after downloading the drive firmware. This command will delay for this amount of time before returning from execution. |
| comment | 0–30 ASCII characters | |

MICRO_DOWNLOAD

This command can be used to download application code, bootware, and NVSRAM files over the SCSI bus to the disk array by using the Write Buffer command (op-code=0×3B). Note: Using the SCSI bus to download these files is much quicker than using the serial communications bus.

| Parameter | Values | Description |
|---|---|---|
| file | 1–30 ASCII characters | Name of the file containing the data to be downloaded. A path may be included. (required) |
| save | yes | Sets the download Mode for the Write Buffer command to a value of 101b ("Download Microcode and Save Mode"). |
| | no | Sets the download Mode for the Write Buffer command to a value of 100b ("Download Microcode"). |
| comment | 0–30 ASCII characters | |

A.8 Time Delay

DELAY

Delay executes a wait period during which STARCOM is dormant. This command may be aborted while it is executing by pressing the <Esc> key. Currently, the <Esc> key will only work when the test is running in automated mode (am). If the DELAY command was executed using the Execute and Step method (<S> key) or the single Execute method (<X> key) then you cannot use the <Esc> key to abort the command.

| Parameter | Values | Description |
| --- | --- | --- |
| seconds | 1–2147483647 | Time to stop activity (required) |
| comment | 0–30 ASCII characters | |

A.9 ECHO

ECHO

ECHO will display/log a user defined message.

| Parameter | Values | Description |
| --- | --- | --- |
| verbose_level | 0–3 | Display message only if the verbose level is this level or higher (default = 0) |
| message | 1–70 ASCII characters | Message to be displayed/logged |
| comment | 0–30 ASCII characters | |

A.10 TEST CONTROL

BRANCH

Test execution of commands will jump to a specified LABEL command if this tests true. Comparison test is executed on bytes in the I/O data buffer. This command is very similar to the JUMP_BUF command.

| Parameter | Values | Description |
| --- | --- | --- |
| label | 1–8 ASCII characters | Branch to this LABEL (see LABEL command) |
| operand | 0–2147483647 | The value which will be operated on with the bytes in the buffer. |
| operation | < <br> <= <br> = <br> > <br> >= <br> AND <br> OR | Operation to be performed |
| offset | 0–16383 | Number of bytes into buffer. |

| Parameter | Values | Description |
| --- | --- | --- |
| length | 1–4 | Number of bytes in buffer. |
| comment | 0–30 ASCII characters | |

CALL

Open another instance of the STARCOM application and run the commands specified in the indicated test file. The calling instance will not execute the next command in its test file until the called instance has completed execution and the STARCOM application has exited. Also, see the SPAWN command.

| Parameter | Values | Description |
| --- | --- | --- |
| file | 1–30 characters | Test file name with optional path (required) |
| test | 0–50 ASCII characters | This line will print with the word PASS or FAIL in the log depending upon whether any unexpected errors are reported. Currently not implemented. |
| $0 | 0–33 characters | Pass this value to the called test's variable $0. |
| . | . | . |
| . | . | . |
| . | . | . |
| $f | 0–33 characters | Pass this value to the called test's variable $F. |
| comment | 0–30 ASCII characters | |

HALT

Stop execution of commands.

| Parameter | Values | Description |
| --- | --- | --- |
| comment | 0–30 ASCII characters | |

JUMP

Test execution of commands will jump to the specified LABEL command.

| Parameter | Values | Description |
| --- | --- | --- |
| label | 1–8 ASCII characters | Branch to this LABEL (see LABEL command) |
| comment | 0–30 ASCII characters | |

JUMP_BUF

Test execution of commands will jump to a specified LABEL command if this tests true. Comparison test is executed on bytes in the I/O data buffer.

| Parameter | Values | Description |
| --- | --- | --- |
| label | 1–8 ASCII characters | Branch to this LABEL (see LABEL command) |
| offset | 0–262144 | Offset in the I/O data buffer that comparison will begin at. |
| length | 0–80 | Beginning with the offset, the total number of |

| Parameter | Values | Description |
|---|---|---|
| | | bytes in the buffer that will be compared with the operand. |
| operation | < | Operation to be performed |
| | <= | |
| | = | |
| | > | |
| | >= | |
| | AND | |
| | OR | |
| operand | 2–40 hex characters | Up to 40 hex characters that will be compared with the buffer. The length of this pattern must match the length specified. Also, there must be an even number of characters in the pattern. |
| comment | 0–30 ASCII characters | |

JUMP_NUM

Test execution of commands will jump to a specified LABEL for a specified number of iterations.

| Parameter | Values | Description |
|---|---|---|
| label | 1–8 ASCII characters | Branch to this LABEL (see LABEL command) |
| iterations | 0–8192 | Number of iterations to jump. |
| current | 0–8192 | Current iteration number. Normally this will not be changed by the user. |
| comment | 0–30 ASCII characters | |

JUMP_STS

Test execution of commands will jump to a specified LABEL based on the last SCSI status.

| Parameter | Values | Description |
|---|---|---|
| label | 1–8 ASCII characters | Branch to this LABEL (see LABEL command) |
| operation | < | Operation to be performed |
| | <= | |
| | = | |
| | > | |
| | >= | |
| | AND | |
| | OR | |
| status | 0–99 | SCSI status. This value will be compared to the last SCSI status received. |
| Comment | 0–30 ASCII characters | |

JUMP_VAR

Test execution of commands will jump to a specified LABEL command if this tests true. Comparison test is executed on one of the 16 variables ($0–$1) available.

| Parameter | Values | Description |
|---|---|---|
| label | 1–8 characters | Branch to this LABEL (see LABEL command) |
| variable | $0 through $F | One of the available variables. |
| type | binary or integer | The type of variable. |
| offset | 0–4096 | Number of bytes into variable (binary only). |
| length | 0–4096 | Number of bytes in variable (binary only). |
| operation | < | Operation to be performed |
| | <= | |
| | = | |
| | > | |
| | >= | |
| | AND | |
| | OR | |
| operand | 2–30 hex characters | Up to 30 hex characters that will be compared with the variable. The length of this pattern must match the length specified. Also, there must be an even number of characters in the pattern. |
| comment | 0–30 ASCII characters | |

LABEL

Used as destination for BRANCH command and all of the JUMP commands.

| Parameter | Values | Description |
|---|---|---|
| label | 1–8 ASCII characters | Label name. |
| comment | 0–30 ASCII characters | |

MESSAGE_BOX

Halt the execution of the test file and display a pop-up message box on the screen. The message box will display the message specified and will have a single OK button. The execution of the test file will restart after the OK button has been clicked. This command is useful for running manual tests and prompting the test operator to perform a task.

| Parameter | Values | Description |
|---|---|---|
| message1 | 0–33 ASCII characters | First line of text. |
| message2 | 0–33 ASCII characters | Second line of text. |
| message3 | 0–33 ASCII characters | Third line of text. |

SPAWN

Open another instance of the STARCOM application and run the commands specified in the indicated test file. This command is similar to the CALL command. The difference is that the calling instance of STARCOM will not wait for the spawned instance of STARCOM to complete before the calling instance continues executing the next command in its test file. Also, see the CALL command.

| Parameter | Values | Description |
|---|---|---|
| file | 1–30 characters | Test file name with optional path (required) |
| test | 0–50 ASCII characters | This line will print with the word PASS or FAIL in the log depending upon whether any unexpected errors are reported. Currently not implemented. |
| $0 | 0–33 characters | Pass this value to the called test's variable $0. |
| . | . | . |
| . | . | . |
| $f | 0–33 characters | Pass this value to the called test's variable $F. |
| comment | 0–30 ASCII characters | |

System

Perform DOS prompt commands. Currently, the only DOS commands supported are copy, del, and rename.

| Parameter | Values | Description |
|---|---|---|
| command | 0–40 ASCII characters | The DOS command and command line parameters to be executed. For example, copy starcom.hsc test.hsc. |
| pause | yes or no | If yes then a message box will be displayed on the monitor stating that the execution of the command has completed (or terminated). |

-continued

| Parameter | Values | Description |
|---|---|---|
| | | The SYSTEM command will not return from execution until the OK button of the message box has been clicked. This is a way to pause the execution of your test file. If you want to use the pause option then you may want to see the MESSAGE_BOX command. |
| overlay | yes or no | Currently not implemented. |
| comment | 0–30 ASCII characters | |

TESTING_OFF

Skip the commands following this command until the TESTING_ON is encountered in the test file.

| Parameter | Values | Description |
|---|---|---|
| comment | 0–30 ASCII characters | |

TESTING_ON

Resume command execution if a previous TESTING_OFF command was encountered, otherwise, do nothing.

| Parameter | Values | Description |
|---|---|---|
| comment | 0–30 ASCII characters | |

A.11 LOG CONTROL COMMANDS

CONFIG_LOG_IT

This command will insert the current system configuration parameters into the log. The values that will be put into the log are: Port ID, Host ID, Target ID, LUN, Width, Period, Offset, Transfer Mode, Messages, Disconnect, Block Size, and Time-out.

| Parameter | Values | Description |
|---|---|---|
| comment | 0–30 ASCII characters | |

LOG_DEFAULTS

This command will set the following fields to default values. In subsequent LOG_SET commands any field where a '*' character appears the default value will be used for logging test PASS and FAIL lines.

| Parameter | Values | Description |
|---|---|---|
| raid_level | 0, 1, 3, 5 | Current raid level of SDAC. |
| mode | degraded formatting optimum reconstruction | Current mode of SDAC. |
| configuration | 0–4096 ASCII characters | Any of the defined configuration identifiers for the SDAC. |
| test_name | 0–12 ASCII characters | The name of the test file with its extension. |
| test_number | 0–999 | The number of test cases within this test category. |
| result_line_format | 1992_standard or 1995_standard | Changes logging format. |
| test_group | DEST or HOST | Used with 1995_standard. |

LOG_SET

This command will set the following fields to be used in logging any subsequent test PASS and FAIL lines.

| Parameter | Values | Description |
|---|---|---|
| raid_level | 0, 1, 3, 5 | Current raid level of SDAC. |
| mode | degraded formatting optimum reconstruction | Current mode of SDAC. |
| configuration | 0–4096 characters | Any of the defined configuration identifiers for the SDAC. |
| test_name | 0–12 characters | The name of the test file with its extension. |
| test_number | 0–999 | The number of test cases within this test category. |
| result_line_format | 1992_standard or 1995_standard | Changes logging format. |
| test_group | DEST or HOST | Used with 1995_standard. |

TIME_STAMP

Log/display the current date and time. The log entry will look like the following:

DATE: Oct. 2, 1997 (MM/DD/YYYY) TIME: 13:06:16 (hr:min:sec)

| Parameter | Values | Description |
|---|---|---|
| comment | 0–30 ASCII characters | |

A.12 Operation

OP_BINARY

This command will allow various operations to be performed between variables, buffers, and constants.

| Parameter | Values | Description |
|---|---|---|
| source_type | buffer constant variable | Where the source value is from. |
| source | 0–30 ASCII characters | Constant value or variable such as $1. Not used for source_type equal to "buffer". |
| source_offset | 0–4095 | Byte offset into variable or buffer. |
| dest_type | buffer variable | Where the resulting value will go. |
| dest | 0–30 ASCII characters | Used with variable only to specify which variable to put the result into. |
| dest_offset | 0–4095 | Byte offset into variable or buffer. |
| operation | add | |

-continued

| Parameter | Values | Description |
| --- | --- | --- |
| | and | |
| | move | |
| | subtract | |
| | or | |
| | xor | |
| length | 0–16383 | Number of bytes used for the operation. For a "constant" source_type leave this as '*' to default constant length. |
| comment | 0–30 ASCII characters | |

A.13 Automated I/O Commands
DISK_RAND_WR_VER

This command will perform WRITE_EXT and READ_EXT commands and the verification is performed by comparing the data read with the data that was written. These I/Os will occur at random logical block addresses and the seed for the random number generator is based off of the internal clock. In other words, one cycle of this command will write data to a random logical block address, read the same amount of data from the same logical block address, and then compare the two sets of data.

| Parameter | Values | Description |
| --- | --- | --- |
| timer | disabled or enabled | Currently not implemented. |
| dpo | on | The target shall assign the logical blocks accessed by this command the lowest priority for being fetched into or retained by the cache. |
| | off | The priority shall be determined by the retention priority fields in the cache page. Note: The setting on this command applies to the WRITE_EXT and the READ_EXT commands. |
| fua | on | The target shall access the specified logical blocks from the media. |
| | off | The target may satisfy the command by accessing the cache memory. Note: The setting on this command applies to the WRITE_EXT and the READ_EXT commands. |
| block_size | 512 | Data block size. Currently hard-coded at a value of 512 bytes. |
| transfer_cnt_in_blks | 0–99999 | The number of blocks that will be transferred to the target during one I/O. |
| io_cnt | 0–3000000 | The number of I/Os to send to the target. (required to be 1 or greater for any I/Os to occur) |
| start_block_address | 0–4294967295 | The logical block address where I/Os will start. |
| soft_hard_error_log | disabled or enabled | If enabled then extra error logging will occur when an error occurs. The extra logging will be the command name, sense key, retry count, and recovered error count. |
| replace_defect_hw_sw | rep_sw | Currently not implemented. |
| | acum_sw | |
| | rep_hw | |
| | acum_hw | |
| end_block_address | 0–4294967295 | Input value is ignored by the code. The end address is calculated based off of transfer_cnt_in_blks, io_count, and start_block_address. |
| data_pattern | 0–32 hex characters | This is the data pattern that will be written to the target's medium. (default = 00 for each byte) |
| block_id | disabled or enabled | If enabled then each block of data that is transferred to the target will contain the logical block address in the first four bytes of the block. |
| max_soft_err | 0–1000 | The maximum number of errors that can occur for this command before the command reports a complete failure and returns from execution. |
| max_retry_count | 0–100 | The maximum number of retries that can |

| Parameter | Values | Description |
|---|---|---|
| retry_sense_keys | 0–18 sense keys | occur for a single I/O (WRITE_EXT or READ_EXT) before the DISK_RAND_WR_VER command reports a complete failure and returns from execution. These are the sense keys that a single I/O (WRITE_EXT or READ_EXT) will retry on when it receives a bad status. if the max_retry_count field is set to 0 or is blank then this field will be ignored. For example, this field will have a value of 0601 if you would like the I/Os to retry on sense keys of 06 and 01. Each sense key needs to be two characters long when put into this field. |

DISK_WRITE_VERIFY

This command is exactly the same as the DISK_RAND_WR_VER command except for the fact that it will perform the I/Os sequentially rather than randomly. Also, it has an additional field called increment_per_io as well as different criteria for the io_cnt field. For more details on the description of this automated test then refer to the description for the DISK_RAND_WR_VER command.

| Parameter | Values | Description |
|---|---|---|
| timer | disabled or enabled | Currently not implemented. |
| dpo | on | The target shall assign the logical blocks accessed by this command the lowest priority for being fetched into or retained by the cache. |
|  | off | The priority shall be determined by the retention priority fields in the cache page. Note: The setting on this command applies to the WRITE_EXT and the READ_EXT commands. |
| fua | on | The target shall access the specified logical blocks from the media. |
|  | off | The target may satisfy the command by accessing the cache memory. Note: The setting on this command applies to the WRITE_EXT and the READ_EXT commands. |
| block_size | 512 | Data block size. Currently hard-coded at a value of 512 bytes. |
| transfer_cnt_in_blks | 0–99999 | The number of blocks that will be transferred to the target during one I/O. |
| io_cnt | 0–3000000 | The number of I/Os to send to the target. Hint: If this field has a value of 0 then I/Os will be issued to the entire capacity of the LUN. |
| start_block_address | 0–4294967295 | The logical block address where I/Os will start. |
| soft_hard_error_log | disabled or enabled | If enabled then extra error logging will occur when an error occurs. The extra logging will be the command name, sense key, retry count, and recovered error count. |
| replace_defect_hw_sw | rep_sw acum_sw | Currently not implemented. |

| Parameter | Values | Description |
|---|---|---|
| end_block_address | rep_hw acum_hw 0–4294967295 | Input value is ignored by the code. The end address is calculated based off of transfer_cnt_in_blks, io_count, and start_block_address. |
| data_pattern | 0–32 hex characters | This is the data pattern that will be written to the target's medium. (default = 00 for each byte) |
| block_id | disabled or enabled | If enabled then each block of data that is transferred to the target will contain the logical block address in the first four bytes of the block. |
| increment_per_io | 0–16383 | If this field is 0 then the increment per I/O is equal to the transfer_cnt_in_blks field, otherwise, the increment per I/O is equal to the value put in this field. For example, let's say the increment_per_io is 0, transfer_cnt_in_blks is 400, and the first I/O is issued to logical block address (LBA) 0. With this case the second I/O will start at LBA 400, third I/O at LBA 800, etc. Now let's say the increment_per_io is 10, transfer_cnt_in_blks is 400, and the first I/O is issued to LBA 0. Now the second I/O will start at LBA 10, third I/O at LBA 20, etc. |
| max_soft_err | 0–1000 | The maximum number of errors that can occur for this command before the command reports a complete failure and returns from execution. |
| max_retry_count | 0–100 | The maximum number of retries that can occur for a single I/O (WRITE_EXT or READ_EXT) before the DISK_WRITE_VERIFY command reports a complete failure and returns from execution. |
| retry_sense_keys | 0–16 sense keys | These are the sense keys that a single I/O (WRITE_EXT or READ_EXT) will retry on |

| Parameter | Values | Description |
|---|---|---|
| | | when it receives a bad status. If the max_retry_count field is set to 0 or is blank then this field will be ignored. For example, this field will have a value of 0601 if you would like the I/Os to retry on sense keys of 06 and 01. Each sense key needs to be two characters long when put into this field. |

RAND_WRITE_VERIFY

This command will perform WRITE_VERIFY commands (op-code=0x2E). These I/Os will occur at random logical block addresses and the seed for the random number generator is based off of the internal clock.

| Parameter | Values | Description |
|---|---|---|
| timer | disabled or enabled | Currently not implemented. |
| parity_check | disabled or enabled | When this is enabled the controller will write the data to the requested block(s), and take actions to insure that when the write operation is complete, the parity information for the data written is accurate and the data written to the data drive can be read without error. This function allows inconsistent parity blocks to be updated under host control. |
| block_size | 512 | Data block size. Currently hard-coded at a value of 512 bytes. |
| transfer_cnt_in_blks | 0–99999 | The number of blocks that will be transferred to the target during one I/O. |
| io_cnt | 0–3000000 | The number of I/Os to send to the target. (required to be 1 or greater for any I/Os to occur) |
| start_block_address | 0–4294967295 | The logical block address where I/Os will start. |
| soft_hard_error_log | disabled or enabled | If enabled then extra error logging will occur when an error occurs. The extra logging will be the command name, sense key, retry count, and recovered error count. |
| replace_defect_hw_sw | rep_sw acum_sw rep_hw acum_hw | Currently not implemented. |
| end_block_address | 0–4294967295 | Input value is ignored by the code. The end address is calculated based off of transfer_cnt_in_blks, io_count, and start_block_address. |
| data_pattern | 0–32 hex characters | This is the data pattern that will be written to the target's medium. (default = 00 for each byte) |
| block_id | disabled or enabled | If enabled then each block of data that is transferred to the target will contain the logical block address in the first four bytes of the block. |
| increment_per_io | 0–16383 | Input is ignored. Not used for this command. |

| Parameter | Values | Description |
|---|---|---|
| max_soft_err | 0–1000 | The maximum number of errors that can occur for this command before the command reports a complete failure and returns from execution. |
| max_retry_count | 0–100 | The maximum number of retries that can occur for a single I/O (WRITE_VERIFY) before the RAND_WRITE_VERIFY command reports a complete failure and returns from execution. |
| retry_sense_keys | 0–16 sense keys | These are the sense keys that a single I/O (WRITE_VERIFY) will retry on when it receives a bad status. If the max_retry_count field is set to 0 or is blank then this field will be ignored. For example this field will have a value of 0601 if you would like the I/Os to retry on sense keys of 06 and 01. Each sense key needs to be two characters long when put into this field. |

SDAC_SEQ_VERIFY

This command will perform VERIFY commands (op-code=0x2F). These verifications will be issued to the specified logical block addresses in sequential order. Also, the ParChk bit in offset byte 1 of the CDB is set to 1 and the BytChk bit is set to 0.

| Parameter | Values | Description |
|---|---|---|
| timer | disabled or enabled | Currently not implemented. |
| block_size | 512 | Data block size. Currently hard-coded at a value of 512 bytes. |
| transfer_cnt_in_blks | 0–99999 | Specifies the number of contiguous logical blocks of data that shall be verified. A value of zero indicates that no logical blocks shall be verified, but this condition will not throw an error. |
| io_cnt | 0–3000000 | The number of verifications to issue to the target. Hint: If this field has a value of 0 then verifications will be issued to the entire capacity of the LUN. |
| start_block_address | 0–4294967295 | The logical block address where I/Os will start. |
| soft_hard_error_log | disabled or enabled | If enabled then extra error logging will occur when an error occurs. The extra logging will be the command name, sense key, retry count, and recovered error count. |
| replace_defect_hw_sw | rep_sw acum_sw rep_hw acum_hw | Currently not implemented. |
| end_block_address | 0–4294967295 | Input value is ignored by the code. The end address is calculated based off of |

-continued

| Parameter | Values | Description |
|---|---|---|
| increment_per_io | 0–16383 | transfer_cnt_in_blks, io_count, and start_block_address. If this field is 0 then the increment per verify is equal to the transfer_cnt_in_blks field, otherwise, the increment per verify is equal to the value put in this field. For example, let's say the increment_per_io is 0, transfer_cnt_in_blks is 400, and the first verify is issued to logical block address (LBA) 0. With this case the second verify will start at LBA 400, third verify at LBA 800, etc. Now let's say the increment_per_io is 10, transfer_cnt_in_blks is 400, and the first verify is issued to LBA 0. Now the second verify will start at LBA 10, third verify at LBA 20, etc. |
| max_soft_err | 0–1000 | The maximum number of errors that can occur for this command before the command reports a complete failure and returns from execution. |
| max_retry_count | 0–100 | The maximum number of retries that can occur for a single VERIFY command before the SDAC_SEQ_VERIFY command reports a complete failure and returns from execution. |
| retry_sense_keys | 0–16 sense keys | These are the sense keys that a single VERIFY command will retry on when it receives a bad status. If the max_retry_count field is set to 0 or is blank then this field will be ignored. For example, this field will have a value of 0601 if you would like the VERIFYs to retry on sense keys of 06 and 01. Each sense key needs to be two characters long when put into this field. |

SEQ_WRITE_VERIFY

This command will perform WRITE_VERIFY commands (op-code=0x2E). These I/Os will be issued to the specified logical block addresses in sequential order.

| Parameter | Values | Description |
|---|---|---|
| timer | disabled or enabled | Currently not implemented. |
| parity_check | disabled or enabled | When this is enabled the controller will write the data to the requested block(s), and take actions to insure that when the write operation is complete, the parity information for the data written is accurate and the data written to the data drive can be read without error. This function allows inconsistent parity blocks to be updated under |

-continued

| Parameter | Values | Description |
|---|---|---|
| block_size | 512 | host control. Data block size. Currently hard-coded at a value of 512 bytes. |
| transfer_cnt_in_blks | 0–100000 | The number of blocks that will be transferred to the target during one I/O. |
| io_cnt | 0–3000000 | The number of verifications to issue to the target. Hint: If this field has a value of 0 then verifications will be issued to the entire capacity of the LUN. |
| start_block_address | 0–4294967295 | The logical block address where I/Os will start. |
| soft_hard_error_log | disabled or enabled | If enabled then extra error logging will occur when an error occurs. The extra logging will be the command name, sense key, retry count, and recovered error count. |
| replace_defect_hw_sw | rep_sw acum_sw rep_hw acum_hw | Currently not implemented. |
| end_block_address | 0–4294967295 | Input value is ignored by the code. The end address is calculated based off of transfer_cnt_in_blks, io_count, and start_block_address. |
| data_pattern | 0–32 hex characters | This is the data pattern that will be written to the target's medium. (default = 00 for each byte) |
| block_id | disabled or enabled | If enabled then each block of data that is transferred to the target will contain the logical block address in the first four bytes of the block. |
| increment_per_io | 0–16383 | If this field is 0 then the increment per I/O is equal to the transfer_cnt_in_blks field, otherwise, the increment per I/O is equal to the value put in this field. For example, let's say the increment_per_io is 0, transfer_cnt_in_blks is 400, and the first I/O is issued to logical block address (LBA) 0. With this case the second I/O will start at LBA 400, third I/O at LBA 800, etc. Now let's say the increment_per_io is 10, transfer_cnt_in_blks is 400, and the first I/O is issued to LBA 0. Now the second I/O will start at LBA 10, third I/O at LBA 20, etc. |
| max_soft_err | 0–1000 | The maximum number of errors that can occur for this command before the command reports a complete failure and returns from execution. |
| max_retry_count | 0–100 | The maximum number of retries that can occur for a single I/O (WRITE_VERIFY) before the SEQ_WRITE_VERIFY command reports a complete failure and returns from execution. |
| retry_sense_keys | 0–16 sense keys | These are the sense keys that a single I/O (WRITE_VERIFY) will retry |

| Parameter | Values | Description |
|---|---|---|
| | | -continued |
| | | on when it receives a bad status. If the max_retry_count field is set to 0 or is blank then this field will be ignored. For example, this field will have a value of 0601 if you would like the I/Os to retry on sense keys of 06 and 01. Each sense key needs to be two characters long when put into this field. |

Appendix B

The Microsoft Win32 API provides a DeviceIoControl function for sending control codes directly to a specified device driver thereby causing the corresponding device to perform the specified operation. The following provides a brief description of the DeviceIoControl function and associated parameters.

BOOL DeviceIoControl(
  HANDLE hDevice, //handle to device of interest
  DWORD dwIoControlCode, //control code of operation to perform
  LPVOID lpInBuffer, //pointer to buffer to supply input data
  DWORD nInBufferSize, //size of input buffer
  LPVOID lpOutBuffer, //pointer to buffer to receive output data
  DWORD nOutBufferSize, //size of output buffer
  LPDWORD lpBytesReturned, // pointer to variable to receive output byte count
  LPOVERLAPPED lpOverlapped //pointer to overlapped structure for asynchronous Parameters hDevice Handle to the device that is to perform the operation.

Call the CreateFile function to obtain a device handle.

dwIoControlCode

Specifies the control code for the operation.

This value identifies the specific operation to be performed and the type of device on which the operation is to be performed. The following values are defined:

| Value | Meaning |
|---|---|
| FSCTL_DISMOUNT_VOLUME | Dismounts a volume. |
| FSCTL_GET_COMPRESSION | Obtains the compression state of a file or directory |
| FSCTL_LOCK_VOLUME | Locks a volume. |
| FSCTL_READ_COMPRESSION | Reserved for future use. |
| FSCTL_SET_COMPRESSION | Sets the compression state of a file or directory. |
| FSCTL_UNLOCK_VOLUME | Unlocks a volume. |
| FSCTL_WRITE_COMPRESSION | Reserved for future use. |
| IOCTL_DISK_CHECK_VERIFY | Obsolete. Use IOCTL_STORAGE_CHECK_VERIFY |
| IOCTL_DISK_EJECT_MEDIA | Obsolete. Use IOCTL_STORAGE_EJECT_MEDIA |
| IOCTL_DISK_FORMAT_TRACKS | Formats a contiguous set of disk tracks. |
| IOCTL_DISK_GET_DRIVE_GEOMETRY | Obtains information on the physical disk's geometry. |
| IOCTL_DISK_GET_DRIVE_LAYOUT | Provides information about each partition on a disk. |
| IOCTL_DISK_GET_MEDIA_TYPES | Obsolete. Use IOCTL_STORAGE_GET_MEDIA_TYPES |
| IOCTL_DISK_GET_PARTITION_INFO | Obtains disk partition information. |
| IOCTL_DISK_LOAD_MEDIA | Obsolete. Use IOCTL_STORAGE_LOAD_MEDIA |
| IOCTL_DISK_MEDIA_REMOVAL | Obsolete. Use IOCTL_STORAGE_MEDIA_REMOVAL |
| IOCTL_DISK_PERFORMANCE | Provides disk performance information. |
| IOCTL_DISK_REASSIGN_BLOCKS | Maps disk blocks to spare-block pool. |
| IOCTL_DISK_SET_DRIVE_LAYOUT | Partitions a disk. |
| IOCTL_DISK_SET_PARTITION_INFO | Sets the disk partition type. |
| IOCTL_DISK_VERIFY | Performs logical format of a disk extent. |
| IOCTL_SERIAL_LSRMST_INSERT | Enables or disables placement of a line and modem status data into the data stream. |
| IOCTL_STORAGE_CHECK_VERIFY | Checks for change in a removable-media device. |
| IOCTL_STORAGE_EJECT_MEDIA | Ejects media from a SCSI device. |
| IOCTL_STORAGE_GET_MEDIA_TYPES | Obtains information about media support. |
| IOCTL_STORAGE_LOAD_MEDIA | Loads media into a device. |
| IOCTL_STORAGE_MEDIA_REMOVAL | Enables or disables the media eject mechanism. | lpInBuffer

Pointer to a buffer that contains the data required to perform the operation.

This parameter can be NULL if the dwIoControlCode parameter specifies an operation that does not require input data.

nInBufferSize

Specifies the size, in bytes, of the buffer pointed to by LpInBuffer.

lpOutBuffer

Pointer to a buffer that receives the operation's output data.

This parameter can be NULL if the dwloControlCode parameter specifies an operation that does not produce output data.

nOutBufferSize

Specifies the size, in bytes, of the buffer pointed to by lpOutBuffer.

lpBytesReturned

Pointer to a variable that receives the size, in bytes, of the data stored into the buffer pointed to by lpOutBuffer.

If lpOverlapped is NULL, lpBytesReturned cannot be NULL. Even when an operation produces no output data, and lpOutBuffer can be NULL, the DeviceloControl function makes use of the variable pointed to by lpBytesReturned. After such an operation, the value of the variable is without meaning.

lpOverlapped is not NULL, lpBytesReturned can be NULL. If this is an overlapped operation, you can get the number of bytes returned by calling GetOverlappedResult. If hDevice is associated with an I/O completion port, you can get the number of bytes returned by calling GetQueuedCompletionStatus.

lpOverlapped

Pointer to an OVERLAPPED structure.

If hDevice was opened with the FILE_FLAG_OVERLAPPED flag, this parameter must point to a valid OVERLAPPED structure. In this case, DeviceloControl is performed as an overlapped (asynchronous) operation. If the device was opened with FILE_FLAG_OVERLAPPED and lpOverlapped is NULL, the function fails in unpredictable ways.

If hDevice was opened without specifying the FILE_FLAG_OVERLAPPED flag, this parameter is ignored and the DeviceloControl function does not return until the operation has been completed, or an error occurs.

Return Values

If the function succeeds, the return value is nonzero.

If the function fails, the return value is zero. To get extended error information, call GetLastError.

Remarks If hDevice was opened with FILE_FLAG_OVERLAPPED and the lpOverlapped parameter points to an OVERLAPPED structure, DeviceloControl is performed as an overlapped (asynchronous) operation. In this case, the OVERLAPPED structure must contain a handle to a manual-reset event object created by a call to the CreateEvent function. For more information on manual-reset event objects, see Synchronization.

If the overlapped operation cannot be completed immediately, the function returns FALSE, and GetLastError returns ERROR_IO_PENDING, indicating that the operation is executing in the background. When this happens, the operating system sets the event object in the OVERLAPPED structure to the nonsignaled state before DeviceloControl returns. The system then sets the event object to the signaled state when the operation has been completed. The calling thread can use any of the wait functions to wait for the event object to be signaled, and then use the GetOverlappedResult function to determine the results of the operation. The GetOverlappedResult function reports the success or failure of the operation and the number of bytes returned in the lpOutBuffer buffer.

APPENDIX C

The Microsoft Windows NT DDK provides a ntddscsi.h header file which defines control codes and structures for accessing a SCSI miniport device driver via the DeviceloControl function. The ntddscsi.h header file follows:

```
/*++ BUILD Version: 0001    // Increment this if a change has global effects
Copyright (c) 1990–1993 Microsoft Corporation
Module Name:
    ntddscsi.h
Abstract:
    This is the include file that defines all constants and types for
    accessing the SCSI port adapters.
Author:
    Jeff Havens
Revision History:
--*/
#ifndef _NTDDSCSIH_
#define _NTDDSCSIH_
//
// Device Name - this string is the name of the device. It is the name
// that should be passed to NtOpenFile when accessing the device.
//
// Note: For devices that support multiple units, it should be suffixed
//       with the Ascii representation of the unit number.
//
#define IOCTL_SCSI_BASE                 FILE_DEVICE_CONTROLLER
#define DD_SCSI_DEVICE_NAME  "\\Device\\ScsiPort"
//
// NtDeviceIoControlFile IoControlCode values for this device.
//
// Warning: Remember that the low two bits of the code specify how the
//       buffers are passed to the driver!
//
#define IOCTL_SCSI_PASS_THROUGH           CTL_CODE(IOCTL_SCSI_BASE, 0x0401, METHOD_BUFFERED,
FILE_READ_ACCESS | FILE_WRITE_ACCESS)
#define IOCTL_SCSI_MINIPORT               CTL_CODE(IOCTL_SCSI_BASE, 0x0402, METHOD_BUFFERED,
FILE_READ_ACCESS | FILE_WRITE_ACCESS)
#define IOCTL_SCSI_GET_INQUIRY_DATA       CTL_CODE(IOCTL_SCSI_BASE, 0x0403, METHOD_BUFFERED,
FILE_ANY_ACCESS)
#define IOCTL_SCSI_GET_CAPABILITIES       CTL_CODE(IOCTL_SCSI_BASE, 0x0404, METHOD_BUFFERED,
```

APPENDIX C-continued

The Microsoft Windows NT DDK provides a ntddscsi.h header file which defines control codes and structures for accessing a SCSI miniport device driver via the DeviceIoControl function. The ntddscsi.h header file follows:

```c
FILE_ANY_ACCESS)
#define IOCTL_SCSI_PASS_THROUGH_DIRECT  CTL_CODE(IOCTL_SCSI_BASE, 0x0405, METHOD_BUFFERED, FILE_READ_ACCESS | FILE_WRITE_ACCESS)
#define IOCTL_SCSI_GET_ADDRESS          CTL_CODE(IOCTL_SCSI_BASE, 0x0406, METHOD_BUFFERED, FILE_ANY_ACCESS)
#define IOCTL_SCSI_RESCAN_BUS           CTL_CODE(IOCTL_SCSI_BASE, 0x0407, METHOD_BUFFERED, FILE_ANY_ACCESS)
#define IOCTL_SCSI_GET_DUMP_POINTERS    CTL_CODE(IOCTL_SCSI_BASE, 0x0408, METHOD_BUFFERED, FILE_ANY_ACCESS)
//
// Define the SCSI pass through structure.
//
typedef struct _SCSI_PASS_THROUGH {
    USHORT Length;
    UCHAR ScsiStatus;
    UCHAR PathId;
    UCHAR TargetId;
    UCHAR Lun;
    UCHAR CdbLength;
    UCHAR SenseInfoLength;
    UCHAR DataIn;
    ULONG DataTransferLength;
    ULONG TimeOutValue;
    ULONG DataBufferOffset;
    ULONG SenseInfoOffset;
    UCHAR Cdb[16];
}SCSI_PASS_THROUGH, *PSCSI_PASS_THROUGH;
//
// Define the SCSI pass through direct structure.
//
typedef struct _SCSI_PASS_THROUGH_DIRECT {
    USHORT Length;
    UCHAR ScsiStatus;
    UCHAR PathId;
    UCHAR TargetId;
    UCHAR Lun;
    UCHAR CdbLength;
    UCHAR SenseInfoLength;
    UCHAR DataIn;
    ULONG DataTransferLength;
    ULONG TimeOutValue;
    PVOID DataBuffer;
    ULONG SenseInfoOffset;
    UCHAR Cdb[16];
}SCSI_PASS_THROUGH_DIRECT, *PSCSI_PASS_THROUGH_DIRECT;
//
// Define SCSI information.
// Used with the IOCTL_SCSI_GET_INQUIRY_DATA IOCTL.
//
typedef struct _SCSI_BUS_DATA {
    UCHAR NumberOfLogicalUnits;
    UCHAR InitiatorBusId;
    ULONG InquiryDataOffset;
}SCSI_BUS_DATA, *PSCSI_BUS_DATA;
//
// Define SCSI adapter bus information structure..
// Used with the IOCTL_SCSI_GET_INQUIRY_DATA IOCTL.
//
typedef struct _SCSI_ADAPTER_BUS_INFO {
    UCHAR NumberOfBuses;
    SCSI_BUS_DATA BusData[1];
} SCSI_ADAPTER_BUS_INFO, *PSCSI_ADAPTER_BUS_INFO;
//
// Define SCSI adapter bus information.
// Used with the IOCTL_SCSI_GET_INQUIRY_DATA IOCTL.
//
typedef struct _SCSI_INQUIRY_DATA {
    UCHAR PathId;
    UCHAR TargetId;
    UCHAR Lun;
    BOOLEAN DeviceClaimed;
    ULONG InquiryDataLength;
    ULONG NextInquiryDateOffset;
    UCHAR InquiryData[1];
}SCSI_INQUIRY_DATA, *PSCSI_INQUIRY_DATA;
```

APPENDIX C-continued

The Microsoft Windows NT DDK provides a ntddscsi.h header file which defines control codes and structures for accessing a SCSI miniport device driver via the DeviceIoControl function. The ntddscsi.h header file follows:

```c
//
// Define header for I/O control SRB.
//
typedef struct _SRB_IO_CONTROL {
    ULONG HeaderLength;
    UCHAR Signature[8];
    ULONG Timeout;
    ULONG ControlCode;
    ULONG ReturnCode;
    ULONG Length;
} SRB_IO_CONTROL, *PSRB_IO_CONTROL;
//
// SCSI port driver capabilities structure.
//
typedef struct _IO_SCSI_CAPABILITIES {
    //
    // Length of this structure
    //
    ULONG Length;
    //
    // Maximum transfer size in single SRB
    //
    ULONG MaximumTransferLength;
    //
    // Maximum number of physical pages per data buffer
    //
    ULONG MaximumPhysicalPages;
    //
    // Async calls from port to class
    //
    ULONG SupportedAsynchronousEvents;
    //
    // Alignment mask for data transfers.
    //
    ULONG AlignmentMask;
    //
    // Supports tagged queuing
    //
    BOOLEAN TaggedQueuing;
    //
    // Host adapter scans down for bios devices.
    //
    BOOLEAN AdapterScansDown;
    //
    // The host adapter uses programmed I/O.
    //
    BOOLEAN AdapterUsesPio;
} IO_SCSI_CAPABILITIES, *PIO_SCSI_CAPABILITIES;
typedef struct _SCSI_ADDRESS {
    ULONG Length;
    UCHAR PortNumber;
    UCHAR PathId;
    UCHAR TargetId;
    UCHAR Lun;
}SCSI_ADDRESS, *PSCSI_ADDRESS;
//
// Define structure for returning crash dump pointers.
//
struct _ADAPTER_OBJECT;
typedef struct _DUMP_POINTERS {
    struct _ADAPTER_OBJECT *AdapterObject;
    PVOID MappedRegisterBase;
    PVOID PortConfiguration;
    PVOID CommonBufferVa;
    LARGE_INTEGER CommonBufferPa;
    ULONG CommonBufferSize;
} DUMP_POINTERS, *PDUMP_POINTERS;
//
// Define values for pass-through DataIn field.
//
#define SCSI_IOCTL_DATA_OUT         0
#define SCSI_IOCTL_DATA_IN          1
#define SCSI_IOCTL_DATA_UNSPECIFIED 2
#endif
```

What is claimed is:

1. A method of utilizing a definition file to define characteristics of at least one parameter of a script command comprising:

displaying for a parameter within a script command, a user input control defined by a definition file, said user input control displaying an identifier for said parameter and a value for said parameter;

receiving user input via said user input control;

generating a parameter value based upon said received user input; and setting said value of said parameter of said script command equal to said generated parameter value.

2. The method of claim 1, further comprising:

generating said user input control based upon a control type defined by said definition file, wherein said definition file defines said control type from a group of control types comprising a radio-button control type, a check-box control type, an edit box control type, a list box control type, and a combo box control type.

3. The method of claim 1, further comprising:

determining whether said generated parameter value is valid for said parameter based upon an allowable range defined by said definition file, wherein said setting of said generated parameter value comprises setting said value of said parameter equal to said generated parameter value only if said generated parameter value is determined valid.

4. The method of claim 1, wherein:

said displaying of a user input control comprises displaying user input controls corresponding to a plurality of parameter values defined for said script command by said definition file, said user input reception comprises receiving said user input indicating a selection from said plurality of parameter values, and said parameter generation comprises setting said parameter value equal to said selection indicated by said user input.

5. The method of claim 1, further comprising:

determining whether said definition file has changed since said displaying step;

re-generating said control based upon said changed definition file in response to determining that said definition file has changed; and re-displaying said control after said re-generating of said control.

6. The method of claim 1, wherein said parameter value generation comprises:

setting said parameter value equal to a default value defined by said definition file in response to said user input not indicating a value for said parameter value.

7. The method of claim 1, further comprising:

parsing said definition file to obtain a first preprocessed definition file; and generating said user input control based upon said first preprocessed definition file.

8. The method of claim 7, further comprising:

determining whether said definition file has changed since said parsing step;

re-parsing said definition file to obtain a second preprocessed definition file in response to said determination that said definition file has changed;

re-generating said user input control based upon said second preprocessed definition file; and re-displaying said user input control after said regeneration of said user input control.

9. A scripting tool for executing a script command having at least one parameter, comprising a display device, a processor, and a memory having stored therein a plurality of instructions which when executed by said processor causes said processor to:

generate a user input control for a parameter within a script command based upon a definition file, said user input control including an identifier and a value for said parameter;

display said user input control upon said display device;

receive user input via said user input control;

generate a parameter value based upon said user input;

set said parameter of said script command equal to said generated parameter value; and execute said script command having said parameter set to said generated parameter value.

10. The scripting tool of claim 9, wherein said plurality of instructions when executed by said processor further causes said processor to:

generate said user input control based upon a control type defined by said definition file, wherein said definition file defines said control type from a group of control types comprising a radio-button control type, a check-box control type, an edit box control type, a list box control type, and a combo box control type.

11. The scripting tool of claim 9, wherein said plurality of instructions when executed by said processor further causes said processor to:

determine whether said parameter value is valid for said parameter based upon an allowable range defined by said definition file; and set said parameter equal to said parameter value only if said parameter value is valid.

12. The scripting tool of claim 9, wherein said plurality of instructions when executed by said processor further causes said processor to:

generate a plurality of valid parameter values for said user input control based upon said definition file;

display upon said display device, said user input control including said plurality of valid parameter values;

receive said user input indicating a selection from said plurality of valid parameter values; and set said parameter value equal to said selection indicated by said user input.

13. The scripting tool of claim 9, wherein said plurality of instructions when executed by said processor further causes said processor to:

determine whether said definition file has changed since displaying said user input control upon said display device;

re-generate said user input control based upon said changed definition file in response to determining that said definition file has changed; and re-displaying said user input control after regenerating said user input control.

14. The scripting tool of claim 9, wherein said plurality of instructions when executed by said processor further causes said processor to:

set said parameter value equal to a default value defined by said definition file in response to said user input not indicating a value for said parameter value.

15. The scripting tool of claim 9, wherein said plurality of instructions when executed by said processor further causes said processor to:

parse said definition file to obtain a first preprocessed definition file; and generate said user input control based upon said first preprocessed definition file.

16. The scripting tool of claim 15, wherein said plurality of instructions when executed by said processor further cause said processor to:

determine whether said definition file has changed since said first preprocessed definition file was obtained;

re-parse said definition file to obtain a second preprocessed definition file in response to determining that said definition file has changed since said first preprocessed definition file was obtained;

re-generate said user input control based upon said second preprocessed definition file; and re-display said user input control upon said display device after said re-generating said control.

17. A method executing a script command having at least one parameter, comprising:

generating a user input control for a parameter of a script command based upon a definition file, said user input control having an identifier and a value for said parameter;

receiving user input for said parameter via said user input control;

generating a parameter value based upon said received user input;

setting said parameter equal to said generated parameter value; and executing said script command having said parameter set to generated parameter value.

18. The method of claim 17, further comprising:

determining whether said parameter value is invalid based upon said definition file; and setting said parameter to a default value defined by said definition file if said parameter value is determined invalid.

19. The method of claim 17, further comprising:

determining whether said definition file has changed since said user input control generation; and in response to said determination that said definition file has changed since said user input control generation,
  (a) re-generating said user input control based upon said changed definition file;
  (b) determining whether said parameter value is invalid based upon said changed definition file; and
  (c) setting said parameter to a default value defined by said changed definition file.

20. The method of claim 17, further comprising parsing said definition file to obtain a preprocessed definition file, wherein:

said user input control generation comprises generating said user input control based upon said preprocessed definition file.

* * * * *